United States Patent
Li et al.

(10) Patent No.: US 10,334,011 B2
(45) Date of Patent: Jun. 25, 2019

(54) EFFICIENT SORTING FOR A STREAM PROCESSING ENGINE

(71) Applicant: Microsoft Technology Licensing, LLC, Redmond, WA (US)

(72) Inventors: Yinan Li, Redmond, WA (US); Badrish Chandramouli, Redmond, WA (US); Jonathan D. Goldstein, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 412 days.

(21) Appl. No.: 15/181,047

(22) Filed: Jun. 13, 2016

(65) Prior Publication Data
US 2017/0359398 A1   Dec. 14, 2017

(51) Int. Cl.
*H04L 29/06* (2006.01)
*H04L 29/08* (2006.01)

(52) U.S. Cl.
CPC .......... *H04L 65/602* (2013.01); *H04L 67/32* (2013.01)

(58) Field of Classification Search
CPC .............................. H04L 65/602; H04L 67/32
USPC .................................................. 709/217, 219
See application file for complete search history.

(56) References Cited

U.S. PATENT DOCUMENTS

| | | | | |
|---|---|---|---|---|
| 5,179,699 A * | 1/1993 | Iyer | ........................... | G06F 7/36 |
| 5,210,870 A | 5/1993 | Baum et al. | | |
| 5,307,485 A * | 4/1994 | Bordonaro | .............. | G06F 7/32 |
| 6,366,911 B1 * | 4/2002 | Christy | ..................... | G06F 7/36 |
| | | | | 707/737 |
| 7,512,829 B2 | 3/2009 | Mital et al. | | |
| 8,261,043 B2 * | 9/2012 | Inoue | .................. | G06F 9/30021 |
| | | | | 712/22 |
| 8,484,243 B2 * | 7/2013 | Krishnamurthy | .......................... | |
| | | | | G06F 17/30979 |
| | | | | 707/771 |

(Continued)

FOREIGN PATENT DOCUMENTS

| | | | | | |
|---|---|---|---|---|---|
| GB | | 2284079 A | * | 5/1995 | ............... G06F 7/36 |
| GB | | 2284079 A | | 5/1995 | |
| WO | WO-2014186242 A1 | * | 11/2014 | ....... G06F 17/30312 |

OTHER PUBLICATIONS

Albutiu et al., "Massively Parallel Sort-Merge Joins in Main Memory Multi-Core Database Systems" In Proceedings of the VLDB Endowment, Aug. 2012, 12 pages.

(Continued)

*Primary Examiner* — Michael C Lai
(74) *Attorney, Agent, or Firm* — Schwegman Lundberg & Woessner, P.A.

(57) ABSTRACT

The techniques and systems described herein are directed to incremental sorting in a stream processing engine. For example, because of network delays, streaming data can be received at a stream processing engine that is out-of-order with respect to the timestamp of the event generation. Streaming data can be incrementally sorted by partitioning events into ordered runs, which provide intermediate arrays of ordered elements. Upon an assertion of a punctuation event (e.g., a progress indicator), partial runs can be output and merged to form sorted streaming data. Further, the sorted streaming data can be used to provide speculative outputs based on speculation latencies, which improves throughput and completeness of processing on the streaming data.

20 Claims, 10 Drawing Sheets

(56) References Cited

U.S. PATENT DOCUMENTS

| | | | | |
|---|---|---|---|---|
| 8,819,376 | B2* | 8/2014 | Joisha | G11C 19/00 |
| | | | | 711/165 |
| 8,843,524 | B2* | 9/2014 | Branson | G06F 17/30516 |
| | | | | 707/608 |
| 9,229,986 | B2* | 1/2016 | Goldstein | G06F 17/30516 |
| 2006/0101086 | A1* | 5/2006 | Ray | G06F 7/36 |
| 2008/0208861 | A1 | 8/2008 | Ray et al. | |
| 2010/0106711 | A1 | 4/2010 | Graefe | |
| 2011/0282812 | A1* | 11/2011 | Chandramouli | G06N 99/005 |
| | | | | 706/12 |
| 2013/0031567 | A1 | 1/2013 | Nano et al. | |
| 2013/0042092 | A1 | 2/2013 | Inoue et al. | |
| 2015/0169683 | A1 | 6/2015 | Chandramouli et al. | |
| 2015/0363245 | A1* | 12/2015 | Mutschler | G06F 9/542 |
| | | | | 719/318 |

OTHER PUBLICATIONS

Inoue, et ai.,"A High-Performance Sorting Algorithm for Multicore Single-Instruction Multiple-Data Processors", Retrieved on: Feb. 12, 2013, pp. 27, Available at: http:/fwww.research.ibm.com/trl/people/inouehrs/pdf/SPE-SIMDsort.pdf.

Intl Preliminary Report on Patentability issued in PCT/US2014/037616, dated Aug. 18, 2015, 11 pgs.

"International Search Report & Written Opinion for PCT Patent Application No. PCT/US2014/037616", dated Sep. 18, 2014, 16 Pages.

Knuth, Donald E., "5.2.4:Sorting by Merging", In Book—The Art of Computer Programming. vol. 3: Sorting and Searching, Dec. 31, 1998, pp. 158-159.

Omara,"Parallel Merge Sort using Barrier", Retrieved on: Aug. 12, 2016, 4 pages, Available at: http:/fblogs.msdn.com/b/pfxteam/archive/2011/06/07/1 0171827 .aspx.

Satish, et ai.,"Designing Efficient Sorting Algorithms for Manycore GPUs", In Proceedings of in 23rd IEEE International Parallel and Distributed Processing Symposium, May 12, 2009, 10 pages.

Zhang et al,"Dynamic Memory Adjustment for External Mergesort" In Proceedings of the 23rd VLDB Conference Athens Greece, Aug. 25, 1997, 10 pages.

Mutschler, et al., "Distributed Low-Latency Out-of-Order Event Processing for High Data Rate Sensor Streams" , In Proceedings of 27th IEEE International Parallel & Distributed Processing Symposium, May 20, 2013, 12 pages.

Ji, et al., "Quality-Driven Continuous Query Execution over Out-of-Order Data Streams", In Proceedings of ACM SIGMOD International Conference on Management of Data, May 31, 2015, pp. 889-894.

Li, et al., "Event Stream Processing with Out-of-Order Data Arrival", In Proceedings of 27th International Conference on Distributed Computing Systems Workshops, Jun. 22, 2007, 8 pages.

Xiao, et al., "Efficient Strategy for Out-of-Order Event Stream Processing", In Journal of Applied Science and Engineering, vol. 17, No. 1, Jan. 2014, pp. 73-80.

"Stream Processing in MATLAB", Published on: Nov. 28, 2014. Available at: http://in.mathworks.com/discovery/stream-processing.html, 5 pgs.

"Apache Flink", Retrieved on: Apr. 19, 2016 Available at: https://flink.apache.org/ , 3 pgs.

"LINQ (Language-Integrated Query)", Retrieved on: Apr. 19, 2016. Available at: https://msdn.microsoft.com/en-us/library/bb397926.aspx , 2 pgs.

"Stream Analytics", Retrieved on: Apr. 19, 2016 Available at: https://azure.microsoft.com/en-us/services/stream-analytics/ , 3 pgs.

Akidau, et al., "The Dataflow Model: A Practical Approach to Balancing Correctness, Latency, and Cost in Massive-Scale, Unbounded, Out-of-Order Data Processing", In Proceedings of 41st International Conference on Very Large Data Bases, vol. 8, Issue 12, Aug. 31, 2015, pp. 1792-1803.

Aldous, et al., "Longest Increasing Subsequences: From Patience Sorting to the Baik-Deift-Johansson Theorem", In Journal of Bulletin (New Series) of the American Mathematical Society, vol. 36, No. 4, Jul. 21, 1999, pp. 413-432.

Babcock, et al., "Models and Issues in Data Stream Systems", In Proceedings of Twenty-First ACM SIGMOD-SIGACT-SIGART Symposium on Principles of Database Systems, Jun. 3, 2002, pp. 1-16.

Babu, et al., "Exploiting k-Constraints to Reduce Memory Overhead in Continuous Queries Over Data Streams", In Journal of ACM Transactions on Database Systems, vol. 29, Issue 3, Sep. 2004, pp. 545-580.

Barga, et al. "Consistent Streaming Through Time: A Vision for Event Stream Processing", In Proceedings of 3rd Biennial Conference on Innovative Data Systems Research, Jan. 7, 2007, pp. 363-374.

Brodal, et al., "On the Adaptiveness of Quicksort", In ACM Journal of Experimental Algorithmics, vol. 12, Aug. 2008, 20 pages.

Chandramouli, et al., "Patience is a Virtue: Revisiting Merge and Sort on Modern Processors", In Proceedings of ACM SIGMOD International Conference on Management of Data, Jun. 22, 2014, pp. 731-742.

Chandramouli, et al., "Trill: A High-Performance Incremental Query Processor for Diverse Analytics", In Proceedings of 41st International Conference on Very Large Data Bases Endowment, vol. 8, No. 4, Aug. 31, 2015, pp. 401-412.

Chandramouli, et al., "High-Performance Dynamic Pattern Matching over Disordered Streams", In Proceedings of 36th International Conference on Very Large Data Bases Endowment, vol. 3, No. 1, Sep. 13, 2010, pp. 220-231.

Dean, et al., "MapReduce: Simplified Data Processing on Large Clusters", In Proceedings of 6th Symposium on Operating System Design and Implementation, Dec. 6, 2004, pp. 1-13.

Estivill-Castro, et al., "A Survey of Adaptive Sorting Algorithms", In Journal of ACM Computing Surveys, vol. 24, No. 4, Dec. 1992, pp. 441-476.

Huffman, David A., "A Method for the Construction of Minimum-Redundancy Codes", In Proceedings of Institute of Radio Engineers, vol. 40, No. 9, Sep. 1952, pp. 1098-1101.

Johnson, et al., "Monitoring Regular Expressions on Out-of-Order Streams", In Proceedings of IEEE 23rd International Conference on Data Engineering, Apr. 15, 2007, pp. 1315-1319.

Krishnamurthy, et al., "Continuous Analytics over Discontinuous Streams", In Proceedings of the ACM SIGMOD International Conference on Management of data, Jun. 6, 2010, pp. 1081-1091.

Li, et al., "Out-of-order Processing: A New Architecture for High-Performance Stream Systems", In Proceedings of the VLDB Endowment, vol. 1, No. 1, Aug. 23, 2008, pp. 274-288.

Liu, et al., "Sequence Pattern Query Processing over Out-of-Order Event Streams", In Proceedings of IEEE 25th International Conference on Data Engineering, Mar. 29, 2009, pp. 784-795.

Mallows, C. L., "Patience Sorting", In Journal of SIAM Review, vol. 4, Issue 2, Apr. 1962, pp. 148-149.

Ryvkina, et al., "Revision Processing in a Stream Processing Engine: A High-Level Design", In Proceedings of the 22nd International Conference on Data Engineering, Apr. 3, 2006, pp. 1-3.

Srivastava, et al., "Flexible Time Management in Data Stream Systems", In Proceedings of the twenty-third ACM SIGMOD-SIGACT-SIGART symposium on Principles of database systems, Jun. 14, 2004, pp. 263-274.

Toshniwal, et al., "Storm@twitter", In Proceedings of the ACM SIGMOD International Conference on Management of Data, Jun. 22, 2014, pp. 147-156.

Tucker, et al., "Exploiting Punctuation Semantics in Continuous Data Streams", In Journal of IEEE Transactions on Knowledge and Data Engineering, vol. 15, Issue 3, May 2003, pp. 555-568.

Wagner, et al., "Device Analyzer: largescale Mobile Data Collection", In Journal of ACM SIGMETRICS Performance Evaluation Review, vol. 41, Issue 4, Mar. 2014, pp. 53-56.

Zaharia, et al., "Discretized Streams: Fault-Tolerant Streaming Computation at Scale", In Proceedings of the Twenty-Fourth ACM

(56) References Cited

OTHER PUBLICATIONS

Symposium on Operating Systems Principles, Nov. 3, 2013, pp. 423-438.

* cited by examiner

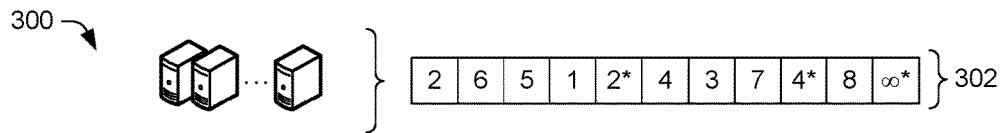
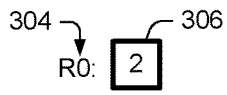
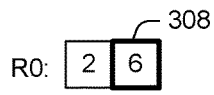
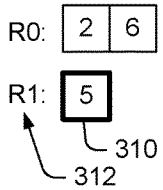
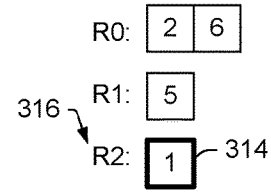
FIG. 3A  FIG. 3B  FIG. 3C  FIG. 3D
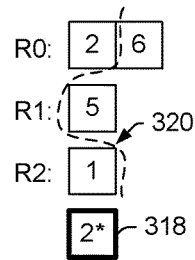
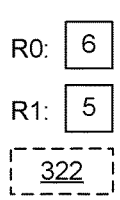
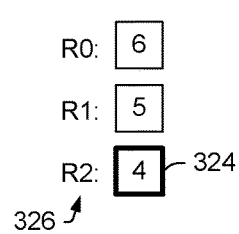
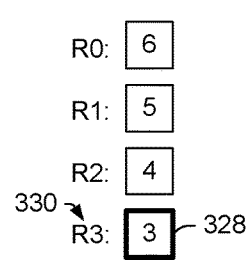
FIG. 3E  FIG. 3F  FIG. 3G  FIG. 3H
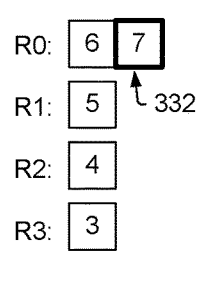
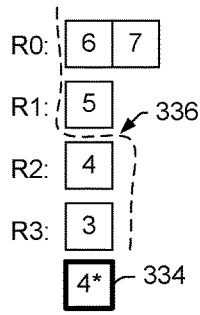
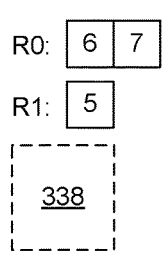
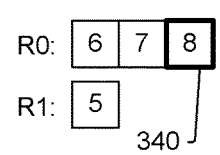
FIG. 3I  FIG. 3J  FIG. 3K  FIG 3L
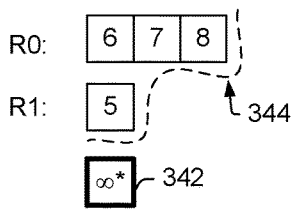
FIG. 3M

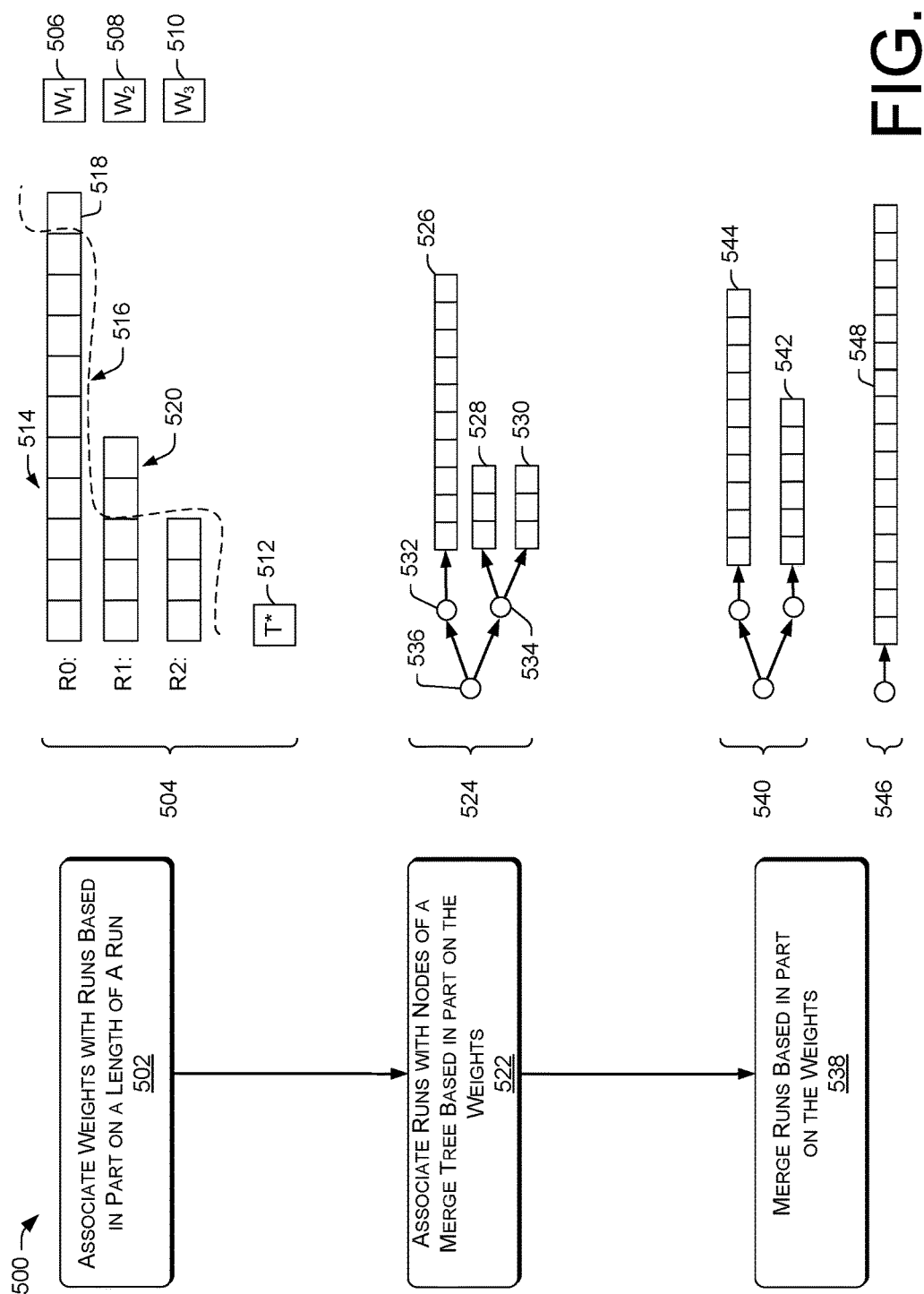

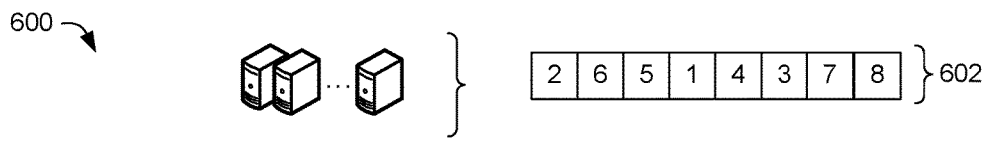
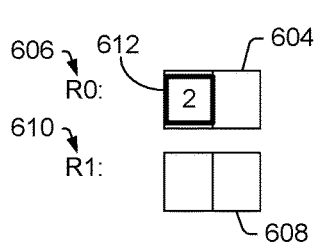
FIG. 6A
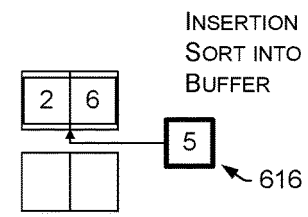
FIG. 6B
FIG. 6C
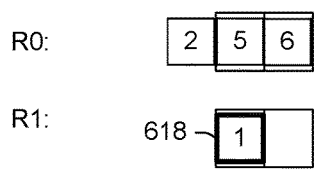
FIG. 6D
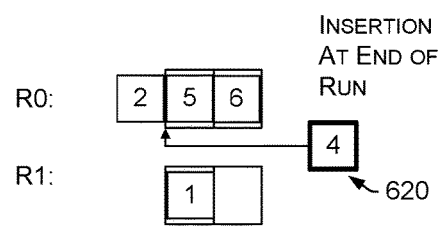
FIG. 6E
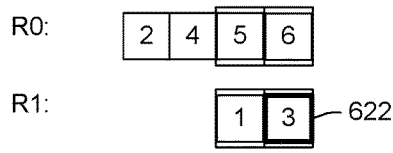
FIG. 6F
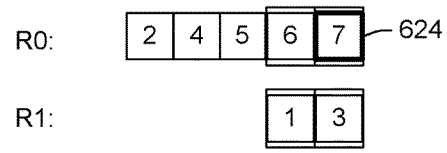
FIG. 6G
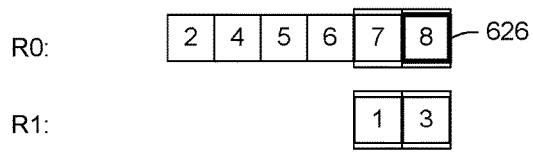
FIG. 6H

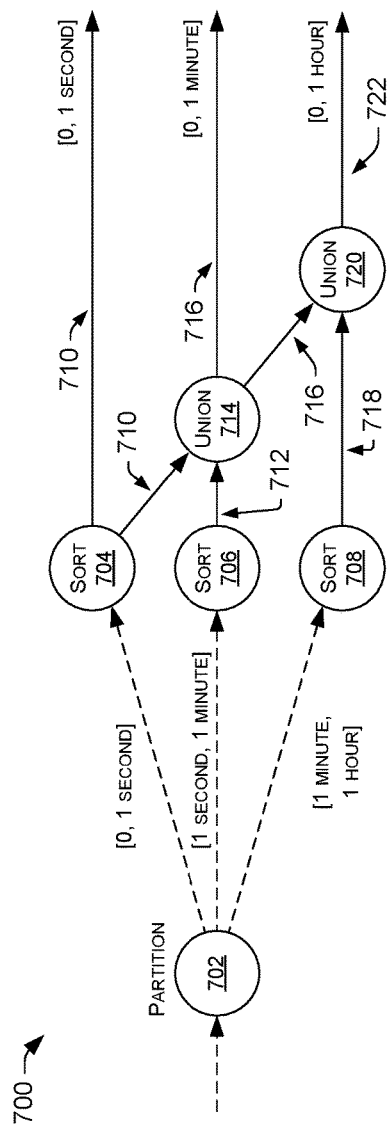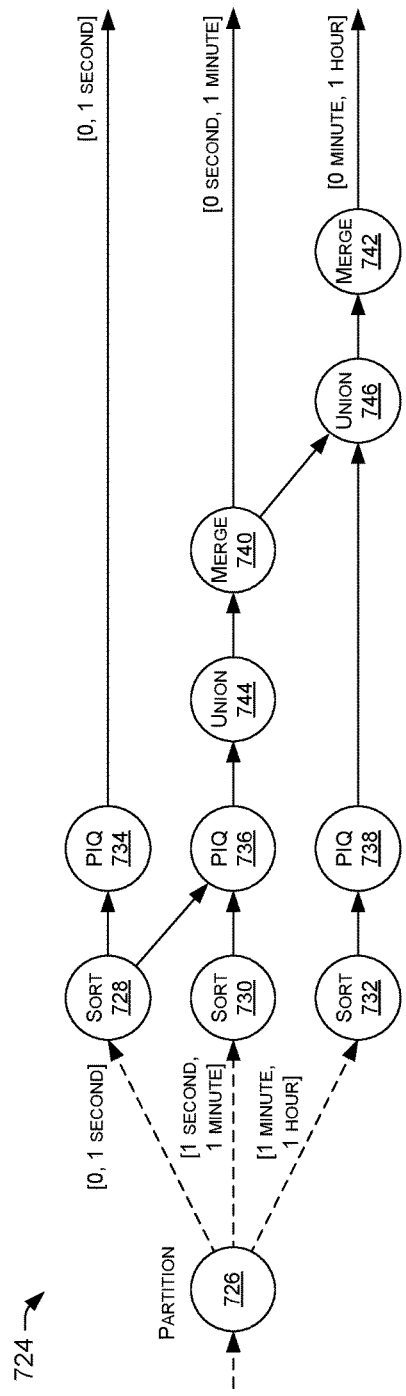

EFFICIENT SORTING FOR A STREAM PROCESSING ENGINE

BACKGROUND

Increasingly, large amounts of data originate from networks of sensors and devices. Query processing and data analytics platforms can analyze the data organized in time order to derive insights from the data. However, due to network delays, intermittent machine failures, and race conditions, events can be received out-of-order compared to the time order of when the events were created. Further, processing these out-of-order streams of data presents tradeoffs between latency, throughput, accuracy, and memory usage.

SUMMARY

The techniques and/or systems described herein are directed to efficient sorting for a stream processing engine. The techniques and/or systems described herein incrementally sort events and output sorted partial results based on progress indicators (e.g., punctuation) in stream processing engines. Further, this framework allows a user to specify a set of latencies associated with a query to provide speculative outputs, which can illustrate early results to be updated at later times with more complete data. The sorting techniques discussed herein can improve a functioning of a computer by reducing both latency and memory usage of query execution, while preserving high completeness and high throughput of data processing.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIGS. 3A-3M illustrate an exemplary implementation for incrementally sorting disordered streaming data in a stream processing engine.

FIG. 5 illustrates a pictorial flow diagram of a process for implementing merging in a stream processing engine.

FIGS. 6A-6H illustrate an exemplary implementation for sorting disordered streaming data using an insertion sort buffer in a stream processing engine.

FIG. 7A is a block diagram illustrating an exemplary process flow for speculative processing.

FIG. 7B is a block diagram illustrating an exemplary process flow for speculative processing including user-defined operators.

DETAILED DESCRIPTION

Figure 1:
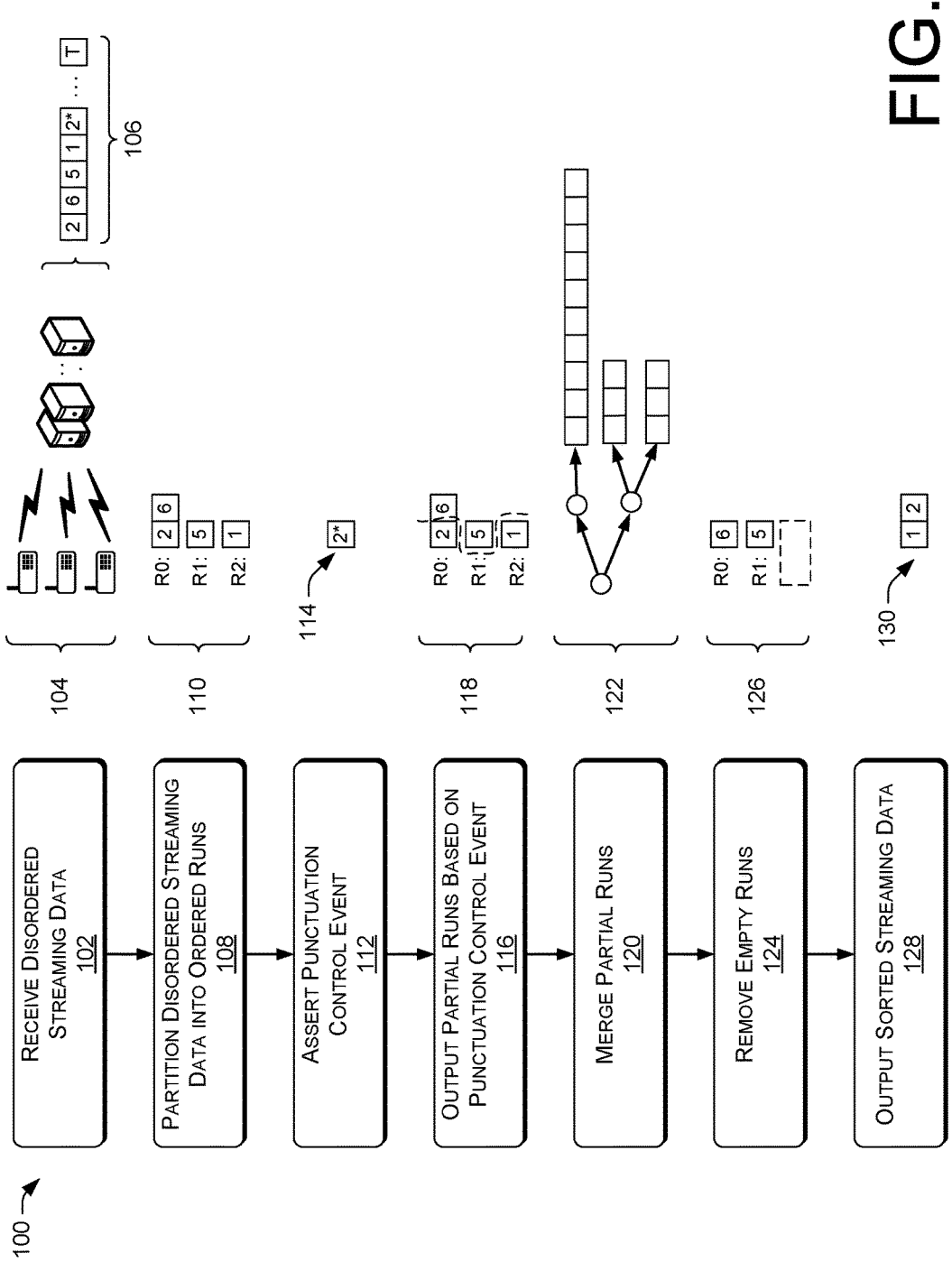
FIG. 1 illustrates a pictorial flow diagram of a process for implementing incremental sorting in a stream processing engine.

The techniques and/or systems described herein provide improved sorting for a stream processing engine. For example, because of network delays, streaming data can be received at a stream processing engine that is out-of-order with respect to the timestamp of the event generation. As the disordered streaming data is received and stored in a reception queue, the disordered streaming data can be partitioned into ordered runs, which provide intermediate arrays of ordered elements. Upon an assertion of a punctuation event (e.g., a progress indicator), elements in runs having a timestamp earlier than or equal to the timestamp associated with the punctuation event can be output as partial runs (and/or whole runs) and merged to form sorted streaming data. Thus, incremental sorting can be performed on the disordered streaming data to efficiently output sorted data in the stream processing engine.

The incremental sorting framework further facilitates the implementation of speculative processing to output partial results based on user-defined latencies. For example, a user can query the stream processing engine for a result or analysis with respect to the streaming data. As part of the query, the user can include user-specified latencies, for example, at one second, one minute, and one hour, for the stream processing engine to provide a result to the user. As the incremental sorting is performed on the disordered streaming data, speculative results can be output to the user, which can illustrate early results (e.g., after one second) to be updated at later times with more complete data (e.g., after one minute or one hour).

As discussed above, the incremental sorting can include the partitioning of streaming data (e.g., disordered streaming data or nearly-ordered streaming data) into ordered runs within a data structure, which provides intermediate arrays of ordered elements. For example, a current element (e.g., from the reception queue) can be appended into a first run whose last element is less than or equal to the current element. If the current element does not fit into a run (e.g., based on a comparison with a timestamp of the last element of each run), a new run can be added to the data structure, and the current element can be added to the new run. Upon the assertion of a punctuation event, the sorting algorithm can search individual runs containing sorted data and can output partial runs including data having timestamps earlier than or equal to the punctuation event timestamp.

In one particular implementation, buffers can be associated with individual runs, which can improve processing by speeding up search operations when inserting a new event. For example, a buffer of 2, 16, 32, or any number of elements can precede a run, such that data can be added to the buffer using an insertion sort, which in some cases allows for an out-of-order element to be inserted into the buffer rather than adding the out-of-order element to another run. As the buffer is filled, the elements can be pushed to the runs for processing as described above. In some instances, partial runs (and/or whole runs) can be output upon the assertion of a punctuation event, as described above.

As the partial runs are output by the incremental sorting processing, the partial runs can be merged and output as a sorted data stream. For example, a weight can be assigned to or associated with each partial run representing a number of elements within each partial run, and the partial runs can be represented in a binary merge tree based in part on the weights associated with each partial run. In some implementations, weights can be assigned to ordered runs prior to an assertion of a punctuation event, such that a binary merge tree can be dynamically built and updated throughout processing. Starting with the smallest partial runs (e.g., based on size or weight), the partial runs of the binary merge tree can be merged and output as sorted streaming data, for further merging with other partial runs and/or for further processing.

The techniques and/or systems described herein can improve a functioning of a computing device by reducing latency and/or by reducing an amount of memory required for sorting streaming data. For example, by using the framework, latency can be reduced by outputting results prior to receiving all data, and completeness and accuracy of results can be improved by later updating results via speculative processing. Further, the incremental sorting described herein can reduce an amount of memory required for sorting the streaming data by reducing a number of runs in memory and by periodically outputting partial runs to be merged as sorted streaming data. In some instances, the incremental sorting techniques discussed herein can reduce an amount of processing required for sorting streaming data, for example, by speeding up search operations when inserting a new event. In a worst case scenario, where streaming data is in reverse order, the processing time of the sorting algorithm is $O(n \log n)$ (where n is the number of elements in the array of streaming data), while in a best case scenario, where the streaming data is already ordered, the incremental sorting algorithm creates only one run, and can be done in linear time $O(n)$. In some instances, the stream processing engine provides throughput on the order of millions of events per second, on the order of a trillion events per day.

Various examples for implementing the incremental sorting and speculative processing within a stream processing engine are described herein with reference to FIGS. 1-10C.

FIG. 1 illustrates a pictorial flow diagram of a process 100 for implementing incremental sorting in a stream processing engine. FIG. 1 illustrates a high-level pictorial flow diagram, and additional details of the implementation are given throughout this disclosure.

At 102, the operation can include receiving disordered streaming data. The disordered streaming data can be received from one or more sensors, computing devices, or the like at a stream processing engine (collectively illustrated as element 104), and can represent discrete-time sequences of real or complex values, which can be referred to as elements. In some instances, the disordered streaming data can include at least a <time, payload> pair, and the "disordered" aspect of the streaming data can refer to a state in which the streaming data is received in a reception queue at a stream processing engine out-of-order compared to the timestamps associated with the streaming data. For example, disordered streaming data 106 illustrates data elements with timestamps (e.g., 2, 6, 5, 1, . . . , T) and a punctuation element (e.g., 2*). As can be understood in the context of this disclosure, the timestamps 2, 6, 5, 1, and T can correspond to a time in which the data element was generated at a sensor, for example. In some instances, real-valued signals (e.g., signals including real numbers) can originate from sensors measuring physical phenomena. In some instances, complex-valued signals (e.g., signals including complex numbers) can result after processing signals in the frequency domain. In some instances, the disordered streaming data can include sequences of structures carrying multiple sensor measurements. In one example, such as audio processing, streaming data can comprise different audio channels. In another example, such as video processing, streaming data can comprise sequences of video frames. In another example, streaming data can comprise user interactions with websites, for example, by tracking user clicks on advertisements, in which case, elements of streams can include fields such as <user ID, page ID (or advertisement ID, time, etc.>. The disordered streaming data 106 represents timestamps of such data received by the stream processing engine prior to the incremental sorting, as discussed herein.

At 108, the operation can include partitioning the disordered streaming data into ordered runs. For example, this operation 108 can include traversing the reception queue of received disordered streaming data and assigning each data element to a particular run, or intermediate queue. For example, data within each run is ordered, such that if a current element to be partitioned is not in sequence with a last element of a particular run, then another run is accessed for a comparison of the current element with the last element of that particular run. If the current element does not fit into any runs, a new run can be added to the incremental sorting framework, and processing can continue. An example 110 illustrates various runs (e.g., R0, R1, and R2), containing data corresponding to the disordered streaming data 106. For example, the run R0 contains elements with a timestamp of 2 and 6, run R1 contains an element with a timestamp of 5, and run R2 contains an element with a timestamp of 1.

At 112, the operation can include asserting a punctuation control event. As illustrated in FIG. 1, a punctuation element 114 (e.g., 2*) drives processing forward for data elements having a timestamp before or equal to time 2. In some instances, a punctuation control event can be asserted centrally by the stream processing engine, which essentially acts to finalize processing and/or output partial runs (as discussed below) based on the timestamp associated with the punctuation control event. For example, the stream processing engine can produce a punctuation control event based on time intervals and/or based on a number of received events (e.g., assert a punctuation control event every 1000 events). In some instances, the punctuation control event can be asserted in a distributed manner, such that individual sensors or computing devices providing streaming data can periodically send punctuation control messages to the stream processing engine, thereby indicating to the stream processing engine that the particular sensor or computing device has provided streaming data up until the time associated with the punctuation element. In such a case, the stream processing engine can receive a plurality of punctuation elements from various sensors and/or computing devices providing streaming data, and can select as the punctuation control event a punctuation element having the oldest timestamp. In some instances, the assertion of a punctuation control event for a time T indicates that no future events with a timestamp less than T (e.g., older than T) can be received by the stream processing engine. In some instances, data received after the punctuation control event (having a timestamp lower than or older than the punctuation element) can be discarded, a timestamp can be changed, or an exception can be raised in the stream processing engine.

At 116, the operation can include outputting partial runs based on the punctuation control event. As illustrated by example 118, and as explained in more detail throughout this disclosure, data elements within each run having a timestamp lower than (e.g., older) the punctuation element can be output as a partial run. For example, in the example 118 (corresponding to the assertion of the punctuation element 114), the data element having a timestamp of 2 in R0 can be output as a first partial run. Further, in the example 118, the data element having a timestamp of 1 in R2 can be output as a second partial run.

At 120, the operation can include merging partial runs. Although the example 118 describes only two partial runs, each partial run containing only one element, it can be understood in the context of this disclosure that partial runs can include any length of data (e.g., any number of elements in an intermediate array) and there can be any number of partial runs corresponding to a particular assertion of a punctuation control event. Further, each partial run is ordered internally, and values of two partial runs can be merged to form a single, ordered run, representing ordered or sorted streaming data. In some instances, partial runs can be represented in a binary merge tree, as illustrated in example 122, with shorter runs merged before merging with a longer run. In one particular implementation, the partial runs of the operation 120 would be merged to form sorted or ordered streaming data, in the order of <1, 2>, corresponding to data elements sorted according to timestamps in chronological order.

At 124, the operation can include removing empty runs following the operations 116 and 120. For example, as partial runs are output, one or more runs can be empty, and memory associated with the particular run can be released or reallocated for subsequent processing. In some instances, this operation 124 can improve subsequent processing by speeding up future search operations for inserting new elements into runs as additional data is received. As illustrated in example 126, the remaining runs include R0 and R1, compared to the runs R0, R1, and R2 of the example 110.

At 128, the operation can include outputting sorted streaming data, such as an example 130, including data elements in chronological order. In some instances, the stream processing engine can continue to receive disordered streaming data and incrementally sort the disordered streaming data, while additional processing, such as speculative processing, can be performed on the sorted streaming data.

Figure 2:
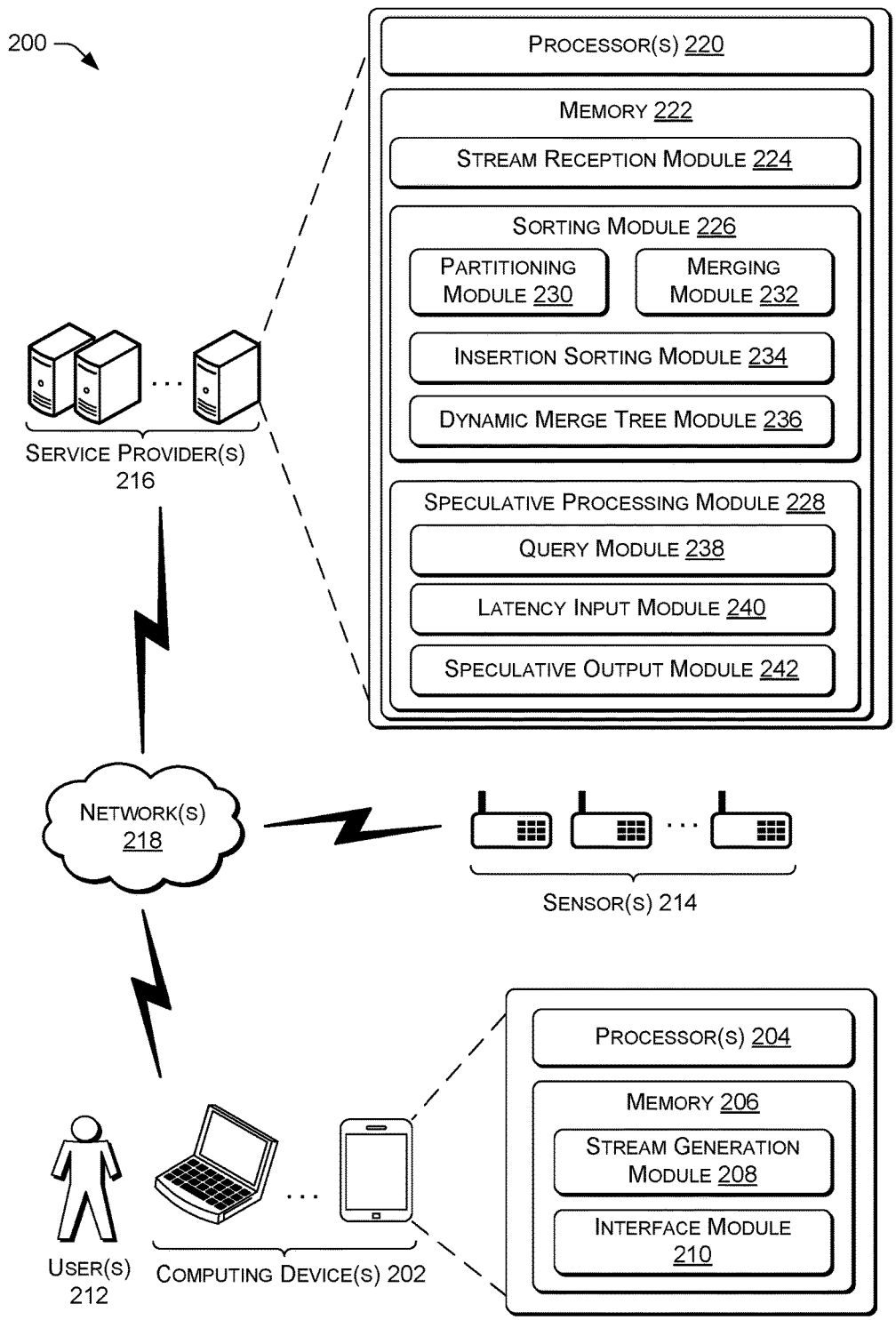
FIG. 2 illustrates an example environment for implementing incremental sorting and speculative processing in a stream processing engine.

FIG. 2 illustrates an example environment 200 for implementing incremental sorting and speculative processing in a stream processing engine. The environment 200 includes computing device(s) 202 having processor(s) 204 and a memory 206 including a stream generation module 208 and an interface module 210. In various instances, the stream generation module 208 can generate one or more streams, as described herein. In some instances, the interface module 210 can include one or more APIs that operate to receive queries from one or more user(s) 212 and/or operate to receive parameters and/or selections, for example, relating to latencies associated with speculative processing. The environment 200 also includes one or more sensor(s) 214 that can generate streams to provide to one or more service provider(s) 216 via the computing device(s) 202 and/or a network 218. In some instances, the service provider(s) 216 provide one or more services to the computing device 202, such as responding to queries associated with the streaming data. To that end, the service provider 216 can include processor(s) 220 and a memory 222 including a stream reception module 224, a sorting module 226, and a speculative processing module 228. In some instances, the service provider 216 can be referred to as a stream processing engine.

The computing device 202 can include, but is not limited to, any one of a variety of computing devices, such as a smart phone, a mobile phone, a personal digital assistant (PDA), an electronic book device, a laptop computer, a desktop computer, a tablet computer, a portable computer, a gaming device, a personal media player device, a server computer, a wearable device, or any other electronic device.

As introduced above, the computing device 202 can include one or more processor(s) 204 and memory 206. The processor(s) 204 can be a single processing unit or a number of units, each of which could include multiple different processing units. The processor(s) 204 can include one or more microprocessors, microcomputers, microcontrollers, digital signal processors, central processing units (CPUs), graphics processing units (GPUs), security processors (e.g., secure cryptoprocessors), and/or other processors. Alternatively, or in addition, some or all of the techniques described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), state machines, Complex Programmable Logic Devices (CPLDs), other logic circuitry, systems on chips (SoCs), and/or any other devices that perform operations based on software and/or hardware coded instructions. Among other capabilities, the processor(s) 204 can be configured to fetch and/or execute computer-readable instructions stored in the memory 206.

The memory 206 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, Phase Change Memory (PCM), Static Random-Access Memory (SRAM), Dynamic Random-Access Memory (DRAM), other types of Random-Access Memory (RAM), Read-Only Memory (ROM), Electrically Erasable Programmable ROM (EEPROM), flash memory or other memory technology, Compact Disc ROM (CD-ROM), Digital Versatile Discs (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The one or more sensor(s) 214 can also include a processor and memory similar to those described in connection with the computing device(s) 202, and can further include any processing, hardware, and/or circuitry to generate one or more data streams to provide streaming data to the service provider 216.

In various embodiments, the computing device 202 can communicate with the service provider 216 via one or more wired or wireless networks 218, such as the Internet, a Mobile Telephone Network (MTN), or other various communication technologies.

In various embodiments, the memory 206 can include an operating system configured to manage hardware and services within and coupled to the computing device 202 for the benefit of other components and other devices.

The stream generation module 208, the interface module 210, the stream reception module 224, the sorting module 226, and the speculative processing module 228 can include hardware and/or software components. For example, the stream generation module 208, the interface module 210, the stream reception module 224, the sorting module 226, and the speculative processing module 228 can be implemented by one or more modules stored in the memory 206 or 222, respectively, and/or by one or more components of the processor(s) 204 or 220, respectively. As used herein, the term "module" is intended to represent example divisions of software and/or firmware for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions can be implemented (e.g., performed) in whole or in part by hardware logic components, such as FPGAs, ASICs, ASSPs, state machines, CPLDs, other logic circuitry, SoCs, and so on.

The stream generation module 208 can perform operations to generate one or more streams of data in accordance with embodiments of the disclosure. For example, streams of data can include readings or samples, where each reading or sample has the format of <SensorID, Time, Value1, Value2, Value3, . . . , ValueN>, or the like. As discussed above, streaming data can include a timestamp indicating a time in which the data is generated at the sensor 214, for example.

The interface module 210 can perform operations to provide one or more interfaces to interact with the stream processing engine in accordance with embodiments of the disclosure. For example, the interface module 210 can provide one or more graphical user interfaces (GUIs) for a user to interface with the stream processing engine. In some instances, the interface module 210 can provide an application programming interface (API) allowing a user to provide queries on the data, select or specify latencies for speculative processing, and/or specify processing in terms of operations, inputs, outputs, underlying data types, etc. In some instances, the interface module 210 can present data on a display of the computing device 202, whereby the data is an output of the stream processing engine.

The stream reception module 224 can perform operations to receive streaming data from the sensors 214 and/or the computing devices 202. In some instances, the stream reception module 224 can include a reception queue and/or buffer to store streaming data until the data can be processed by the sorting module 226 and/or by the speculative processing module 228. For example, the stream reception module 224 can store streaming data in a batched columnar representation in memory. In some instances, the stream reception module 224 can associate a processing time with each data element received by the stream processing engine corresponding to a time in which the data is received at the stream reception module 224. Thus, each data element can include a time in which the data element is created (e.g., an event time) and a time in which the data element is received by the stream processing engine (e.g., a processing time). In some instances, the processing time can be explicitly assigned to streaming data as it is received by the stream reception module 226, and in some instances, the processing time can be implicitly determined, for example, by an order of elements within a reception queue.

The sorting module 226 can perform operations to implement the incremental sorting of the stream processing engine. For example, the sorting module 226 can receive data from the stream reception module 224 as disordered streaming data and can output sorted streaming data. In some instances, order-insensitive operations can be performed on disordered streaming data prior to the data being sorted by the sorting module 226. In some instances, the sorting module 226 operates continuously on the disordered streaming data, while in some instances, the sorting module 226 performs operations in response to an indication from a query, a user, or another module. The sorting module 226 can also include a partitioning module 230, a merging module 232, an insertion sorting module 234, and a dynamic merge tree module 232.

The partitioning module 230 can perform operations to partition received data into one or more runs (e.g., intermediate arrays or queues). In some instances, the portioning module 230 can add runs as needed and remove runs to reduce a usage of memory. In some instances, the partitioning module 230 can include buffers associated with each run, as discussed in connection with FIG. 6. In some instances, the partitioning module 230 can build and maintain an array including a last element of each run, as discussed herein.

The merging module 232 can perform operations to merge partial runs output in response to a punctuation event, as discussed herein. In some instances, the merging module 232 can perform binary merging, linear merging, parallel merging, etc., to output sorted streaming data.

The insertion sorting module 234 can perform operations in connection with the partitioning module 230 to insert elements into buffers, which can in turn, be appended to runs. This operation is discussed in connection with FIG. 6, below.

The dynamic merge tree module 236 can perform operations to dynamically build and maintain partial runs in a merge tree. In some instances, the dynamic merge tree module 236 can evaluate runs and assign or associate weights of the runs based on the length of the runs. In some instances, weights can be applied to partial runs. In some instances, weights can be applied to runs prior to a punctuation event. In some instances, a tree structure can be generated dynamically as runs are generated by the partitioning module 230, and in some instances, a tree structure can be generated in response to a punctuation event, as discussed herein.

The speculative processing module 228 can perform operations to provide speculative outputs in response to a query. The speculative processing module 228 can also include a query module 238, a latency input module 240, and a speculative output module 242. The query module 238 can receive queries, for example, to perform operations on the streaming data. The latency input module 240 can receive one or more latency values indicating times at which a query is to be evaluated to provide speculative processing. For example, the latency input module 240 can receive latency selections of one second, one minute, and one hour, indicating that results are to be provided after those specified times. As results are determined at the indicated times, the speculative output module 242 can output the results to a user, for example, who has submitted a query of the streaming data.

The operations of these modules 208, 210, 224, 226, 228, 230, 232, 234, 236, 238, 240, and 242 are further explained in connection with FIGS. 1 and 3-10 of this disclosure.

The service provider 216 can include one or more computing devices, such as one or more desktop computers, laptop computers, servers, and the like. The one or more computing devices can be configured in a cluster, data center, cloud computing environment, or a combination thereof. In one example, the one or more computing devices provide cloud computing resources, including computational resources, storage resources, and the like, that operate remotely from the computing device 202.

The environment 200 also includes the one or more users 212 to employ the computing device 202. The one or more users 212 can interact with the computing device 202 to perform a variety of operations.

FIGS. 3A-3M (collectively referred to as FIG. 3) illustrate an exemplary implementation 300 for incrementally sorting disordered streaming data in a stream processing engine. By way of example, disordered streaming data 302 is shown, which includes punctuation events. As can be understood, the creation time (e.g., event time) of each data element is represented within the disordered streaming data 302, such as time 2, time 6, time 5, etc., with higher time numbers indicating a later event in time. As can be understood, the disordered streaming data 302 is ordered according to processing time, which can represent a time in which the data elements are received at the stream processing engine. In some instances, data elements of the disordered streaming data 302 can be received out of order due network latency and/or failure. As can be understood, the disordered streaming data 302 can be received by the stream reception module 224 and presented to the sorting module 226 via a reception queue. Each of FIGS. 3A-3M illustrates the sorting of individual elements, or the assertion and processing associated with a punctuation event. For clarity, a bolded outline of a figure element can illustrate a particular operation associated with each figure.

FIG. 3A illustrates a first operation of the incremental sorting, as described herein. A first run R0 304 receives a first element 306. In some instances the operations in FIG. 3A can include initialization operations, such as adding an initial run and/or populating the first element in the run. For example, initially, there can be no run, and sorting the first element 306 can include adding a run. As can be understood, the run R0 304 can correspond to an array of elements in memory in the stream processing engine.

In general, the incremental sorting processing includes appending each element of the disordered streaming data 302 into a first sorted run (e.g., run 304) whose last element is less than or equal to a current element (e.g., the element to be sorted). If such a run does not exist (e.g., the current element is not less than or equal to any last elements of the runs, the operations include creating a new run with and adding the current element, as illustrated in FIG. 3.

Next, FIG. 3B illustrates the addition of element 308 to the run R0. For example, the timestamp of the element 308 (e.g., 6) is greater than the timestamp of the last element in the run R0 (e.g., 2). In FIG. 3B, the element 308 can be referred to as the "current element" because it is the element to be sorted.

FIG. 3C illustrates adding element 310 to a new run R1 312. For example, the sorting operations include determining that the timestamp of the element 310 (e.g., 5) is less than the timestamp of the element 308 (e.g., 6). Therefore, a new run R1 312 is created and the element 310 is added to the run R1 312.

FIG. 3D illustrates the sorting of element 314, which includes generating a new run R2 316 and adding the element 314 to the run R2 316.

In FIG. 3E, a punctuation event 318 is asserted, which outputs data elements having timestamps less than or equal to the punctuation timestamp. For example, a timestamp of the punctuation event 318 is indicated as "2*", and accordingly elements 306 and 314 (having timestamps 2 and 1, respectively), are output in response to the assertion of the punctuation event 318. The identification of elements to be output in response to the punctuation event 318 is illustrated as the line 320. In some instances, a search (such as a binary search) is used within each run to locate elements less than or equal to the punctuation timestamp. In some instances, the output of each run can be referred to as a partial run. Further processing can include merging partial runs (e.g., using a binary merge operation) and outputting the sorted streaming data.

In FIG. 3F, following the assertion of the punctuation event 318, the operation includes removing run R2 316, illustrated as 322. In this manner, the incremental sorting can periodically reduce memory usage, thereby improving a functioning of the stream processing engine.

In FIG. 3G, an element 324 is added to a run R2 326, which can be created after determining that the element 324 does not fit into the runs R0 or R1, which is to say that the timestamp of the element 324 is less than the last elements of runs R0 and R1, respectively.

In FIG. 3H, an element 328 is added to a run R3 330. As described above, the run R3 330 can be created after determining that the element 328 does not fit into the runs R0, R1, or R2, which is to say that the timestamp of the element 328 is less than the last elements of runs R0, R1, and R2, respectively.

In FIG. 3I, an element 332 is added to run R1, because the timestamp of the element 332 is greater than the last element of R1. Further, the element 332 is added to run R0 (instead of runs R1 or R2, for example), because R0 is the first run where element 332 is greater than the last element of the run. Thus, in this manner, the last elements of each run (e.g., 7, 5, 4, and 3 in FIG. 3I) are maintained in a sorted order, which allows for efficient searching for a run to insert a current element, discussed in connection with FIG. 4.

In FIG. 3J, a punctuation event 334 is asserted, which outputs data elements having timestamps less than or equal to the punctuation timestamp. For example, a timestamp of the punctuation event 334 is indicated as "4*", and accordingly elements 324 and 328 (having timestamps 4 and 3, respectively), are output in response to the assertion of the punctuation event 334. In some instances, a binary search is used within each run to locate elements less than or equal to the punctuation timestamp. The identification of elements to be output in response to the punctuation event 334 is illustrated as the line 336. In some instances, the output of each run can be referred to as a partial run. Further processing can include merging partial runs (e.g., using a binary merge operation) and outputting the sorted streaming data.

In FIG. 3K, following the assertion of the punctuation event 334, the operation includes removing runs R2 326 and R3 330, illustrated as 338. In this manner, the incremental sorting can periodically reduce memory usage, thereby improving a functioning of the stream processing engine.

In FIG. 3L, an element 340 is added to a run R1. As part of this operation (and any operation adding or removing elements in runs), the array including the last element of each run would be updated to reflect the addition of the element 340 to R0.

In FIG. 3M, a punctuation event 342 is asserted, which outputs data elements having timestamps less than or equal to the punctuation timestamp. For example, a timestamp of the punctuation event 342 is indicated as "∞*", and accordingly all remaining elements in the remaining runs would be output in response to the assertion of the punctuation event 342. The identification of elements to be output in response to the punctuation event 342 is illustrated as line 344 (e.g., with elements to the left of the line 344 output in FIG. 3M).

The example processes (e.g., in FIGS. 1, 4, 5, 7, and 8) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

Figure 4:
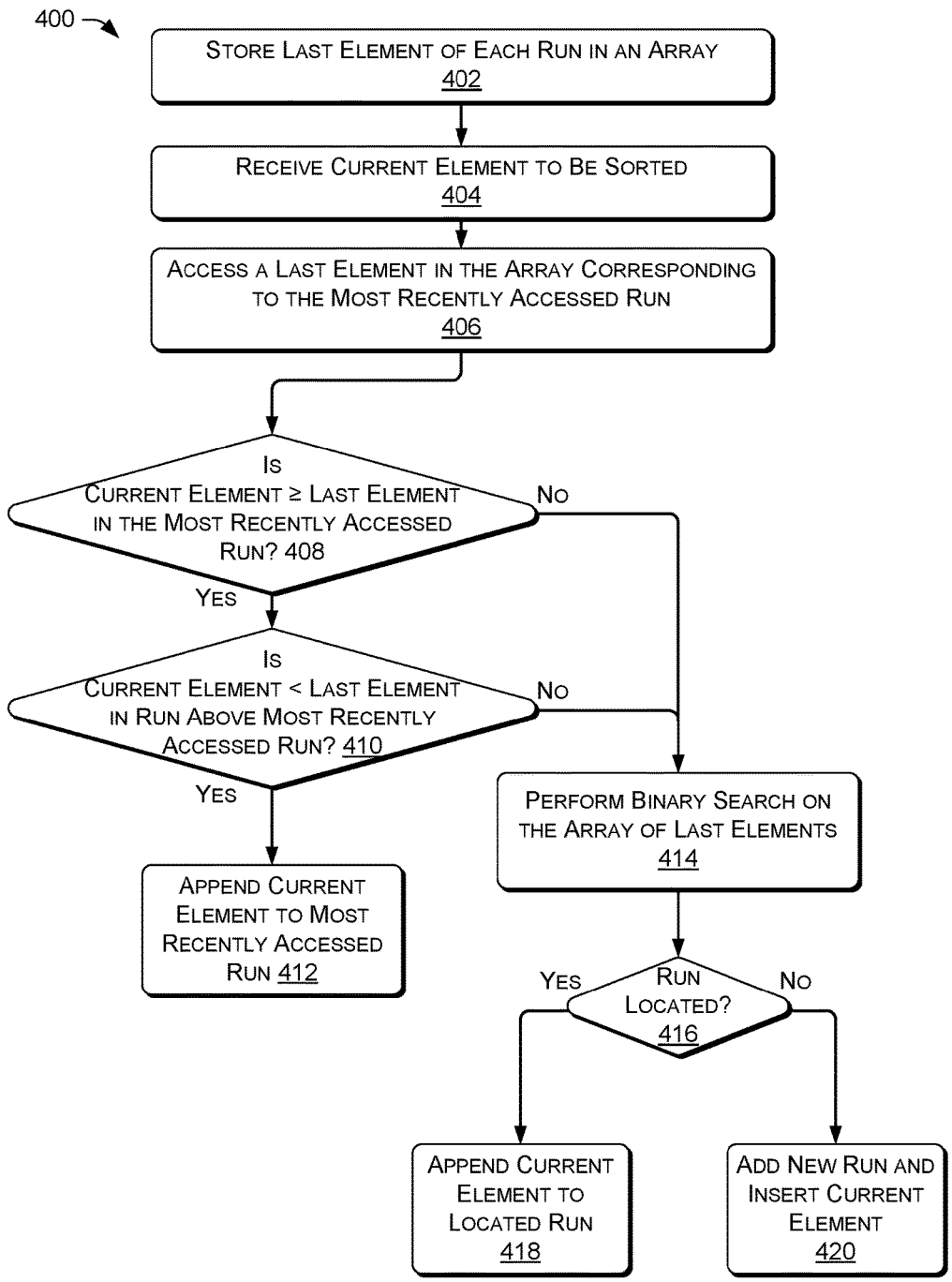
FIG. 4 is a process for efficiently partitioning data within the exemplary sorting algorithm, including locating a run to insert an element.

FIG. 4 is a process 400 for efficiently partitioning data within the exemplary sorting algorithm, including locating a run to insert an element. In one implementation, the process 400 can be performed by the service provider 216 (e.g., the sorting module 226) of FIG. 2. However, processes can be performed in other environments and by other devices as well.

At 402, the operation can include storing a last element of each run in an array. For example, turning to FIG. 3I, an array including the last elements of runs R0, R1, R2, and R3 can include the timestamps 7, 5, 4, and 3, respectively. Further, the array of last elements can be updated throughout the operation of the incremental sorting algorithm, for example, as elements are added to run, as new runs are created, and/or upon the assertion of a punctuation event. For example, at an instant represented in FIG. 3L, the array of last elements would include timestamps 8 and 5, respectively.

At 404, the operation can include receiving the current element to be sorted. For example, the sorting module 226 can receive the current element to be sorted from the stream reception module 224. At 406, the operation can include accessing a last element in the array corresponding to the most recently accessed run to determine if the current element can be appended to the most recently accessed run. In some instances (e.g., with nearly-sorted data, or in the case of interleaved streams from multiple sensors), there can be a high probability that the current element in the disordered streaming data can be appended to the most recently accessed run. Thus, by accessing the most recently accessed run, an amount of processing can be reduced because a search for a correct array can be simplified.

At 408, the operation can determine if the current element is greater than or equal to the last element in the most recently accessed run. If "yes" in the operation 408, the process continues to 410, where the operation determines if the current element is less than the last element in the run above the most recently accessed run. If "yes" in operation 410, the process continues to 412, where the current element can be appended to the most recently accessed run. For example, in FIG. 3G, after appending the element 324 to the run R2 326, the run R2 326 would be considered the most recently accessed run, and the run R1 would be considered to be the run above the most recently accessed run. In some instances, when run R0 is the most recently accessed row, this operation 410 can not be performed.

If the current element is less than the last element in the most recently accessed run (e.g., "no" in operation 408) or the current element is not less than the last element in the run above the most recently accessed run (e.g., "no" in operation 410, the process can continue to 414, where the operation can include performing a binary search on the array of last elements, if needed, to locate a run where to append the current element. As an array of the last elements can contain sorted data, the operation 410 can quickly locate an appropriate run for the next element (e.g., "yes" in operation 416), and in operation 418, the current element can be appended as the last element of the located run. If an appropriate run cannot be located for the current element (e.g., "no" in operation 416) a new run can be added to the data structure and the current element can be inserted into the new run.

In some instances, with respect to the operation 410, if the current element is greater than or equal to the last element in a run above the most recently accessed run (e.g., "no" in operation 410), prior to performing a binary search on the array of last elements (e.g., in the operation 414), the process can determine if the current element is appropriate to insert into the run above the most recently accessed run. That is, operations similar to those described with respect to the operations 408 and 410 can be performed to determine if the current element can be appended to the run above the most recently accessed run.

In some instances, other sorting algorithms can be used as an alternative to a binary search. For example, if the number of sorted runs is less than a certain threshold, a linear scan can be used to find the appropriate run. In some instances, for small array sizes of the array of last elements, it has been shown that linear scan is more efficient than binary search on modern architectures. By way of another example, fewer sorted runs can indicate that the input stream is, in some sense, close to being completely sorted. In these scenarios, it is likely that events are placed in one of a few very first sorted runs, and as a result, a linear scan operation can quickly find the position of the run where to append the current element to be sorted.

At 412, in response to the operation 410, the operation can determine which run to append the current element, or whether to add a new run to the incremental sorting framework. In some instances, after the current element is sorted into an existing run or sorted into a new run, the process 400 can be repeated for each data element received as the disordered streaming data.

FIG. 5 illustrates a pictorial flow diagram 500 of a process for merging partial runs in a stream processing engine. In one implementation, the process 500 can be performed by the service provider 216 (e.g., the sorting module 226) of FIG. 2. However, processes can be performed in other environments and by other devices as well.

At 502, the operation can include associating weights with runs based in part on a length of a run. One particular example 504 in FIG. 5 includes runs R0, R1, and R2, which can be assigned weights Wi 506, W2 508, and W3 510, respectively. Further, the example 504 illustrates a punctuation event 512, which can output partial runs for R0, R1, and R2 (collectively referred to as partial runs 514). The example 504 further illustrates a line 516 indicating the boundary of the data events to be output in response to the punctuation event 512, and illustrates remaining runs 518 and 520 that are not output by the punctuation event 512, in this example. In some instances, the weights 506, 508, and 510 can correspond to a length of each run prior to the punctuation event 512 (e.g., 11, 5, and 3, respectively). In some instances, the weights 506, 508, and 510 can correspond to a length of each partial run after the assertion of the punctuation event 512 (e.g., 10, 3, and 3, respectively).

At 522, the operation can include associating runs with nodes of a merge tree based in parts on the weights assigned in the operation 502. One particular example 524 illustrates partial runs 526, 528, and 530 represented in a binary merge tree. For example, the partial run 526 is represented as a leaf of the node 532, and the partial runs 528 and 530 are represented at a leaf of the node 534. Although the operation 522 refers to associating partial runs with the merge tree, complete runs can be associated with the merge tree prior to a punctuation event and updated dynamically so that runs can be merged quickly upon receipt of a punctuation event.

At 538, the operation can include merging runs based in part on the weight. One particular example 540 illustrates a result of the merge operation between the partial runs 528 and 530. In some instances, a binary merge can be used to merge the partial runs 528 and 530 to provide the merged partial run 542. In some instances, runs having the smallest weights (e.g., representing the fewest data elements) can be merged prior to merging with longer runs. Thus, in the example 540, the partial run 544 can correspond to the partial run 526. After the merged partial run is generated in the operation 538, example 546 illustrates a final merge operation between the runs 542 and 544 to generate the sorted streaming data 548. Thus, the sorted streaming data 548 represents an output of incremental sorting algorithm in response to the punctuation event 512.

FIGS. 6A-6H (collectively referred to as FIG. 6) illustrate an exemplary implementation 600 for sorting disordered streaming data using an insertion sort buffer in a stream processing engine. By way of example, an example of disordered streaming data 602 is shown. Similar to the example described in connection with FIGS. 3A-3M, the disordered streaming data 602 can include punctuation events, although punctuation events are omitted in this exemplary implementation 600 for clarity. As can be understood, the creation time (e.g., event time) of each data element is represented within the disordered streaming data 602, such as time 2, time 6, time 5, etc., with higher time numbers indicating a later event in time, and in some instances, the disordered streaming data 602 is represented in processing time (e.g., the order received at the stream processing engine). In some instances, data elements of the disordered streaming data 602 can be received out of order due network latency and/or failure. As can be understood, the disordered streaming data 602 can be received by the stream reception module 224 and presented to the sorting module 226 via a reception queue. Each of FIGS. 6A-6H illustrates the sorting of individual elements of the disordered streaming data 602. For clarity, a bolded outline of a figure element can illustrate a particular operation associated with each figure.

FIG. 6A illustrates a first operation of the incremental sorting with insertion buffers, as described herein. A first insertion buffer 604 can be associated with a first run R0 606. A second insertion buffer 608 can be associated with a second run R1 610. As can be understood, the insertion buffers 604 and 608 can be any length of elements (e.g., 2, 4, 16, 32, 64, etc.), although the insertion buffers 604 and 608 are illustrated as including two slots for elements in FIGS. 6A-6H. In some instances the operations in FIG. 6A can include initialization operations, such as adding initial run(s) and associating a buffer with each run. As illustrated in FIG. 6A, a first element 612 is added to the insertion buffer 604. As can be understood, the run R0 606 and the insertion buffer 604 can correspond to arrays of elements in memory in the stream processing engine.

In general, the operation of the exemplary implementation 600 operates similarly to the exemplary implementation 300, with the addition of an insertion sort buffer before each run, such that data elements can be added and sorted within the insertion buffer, with elements pushed to each run when a buffer is full. For example, the incremental sorting with insertion buffers includes inserting each element into the insertion buffer such that all element in each insertion buffer are in chronological order (in terms of event time) and such that the timestamp of the first element in each buffer is greater than or equal to a timestamp of the last element of the run associated with the insertion buffer. If a current element cannot be inserted into a buffer while maintaining the order of the buffer, or the current element cannot be appended as the last element of a run, the operations include creating a new run and an associated insertion buffer, and adding the current element to the new insertion buffer, as described herein.

Next, FIG. 6B illustrates the addition of element 614 to the insertion buffer. For example, the timestamp of the element 614 (e.g., 6) is greater than the timestamp of the first element in the insertion buffer associated with the run R0 (e.g., 2). As the insertion buffer can hold both elements 612 and 614, no elements are pushed to the run R0.

FIG. 6C illustrates adding element 616 to the framework. First, the insertion buffer 604 can be parsed to determine if the element 616 can be inserted in order into the buffer. As the timestamp of the element 616 (e.g., 5) falls between elements in the insertion buffer 604, the element 616 is added to the insertion buffer, and the element 612 can be pushed to the run R0 606.

FIG. 6D illustrates adding element 618 to the framework. In some instances, the insertion buffer 604 can be parsed to determine if the element 618 can be inserted in order. Further, the timestamp of the element 618 can be compared to the timestamp of the last element in the run R0 606 to determine if the element 618 can be appended to the end of the run R0 606. As the timestamp of the element 618 (e.g., 1) is less than the timestamp of the last element in the run R0 and the elements in the insertion buffer (e.g., elements 612, 614, and 616, respectively), the element 618 can be added to the insertion buffer 608 associated with the run R1 610. In some instances, a run and/or insertion buffer can be allocated in response to determining that the current element cannot be inserted into any present runs and/or buffers.

FIG. 6E illustrates adding element 620 to the framework as the last element of the run R0 606. In some instances, the insertion buffer 604 can be searched using a binary search (or any other method of searching the buffer) to determine if the current element 620 can be inserted into the insertion buffer 604. As the timestamp of the element 620 is less than any element in the insertion buffer 604 and greater than the last element of the run R0 606, the element 620 is appended to the run R0 606.

FIG. 6F illustrates adding element 622 to the framework. The insertion buffers 604 and 608 can be searched using a binary search, and the element 622 can be inserted as the second element of the insertion buffer 608.

FIG. 6G illustrates adding element 624 to the framework. As the element 624 is added to the insertion buffer 604, the first element in the buffer (e.g., element 616) can be pushed to the run R0 606 where the element 616 becomes the last element of the run R0 606.

FIG. 6H illustrates adding element 626 to the framework, which pushes the element 620 to the run R0 606. The element 620, in turn, becomes the last element of the run R0 606.

As illustrated, the disordered streaming data 602 can be sorted according to the incremental sorting algorithm, using fewer runs than the sorting algorithm illustrated in connection with FIGS. 3A-3M. In some instances, this can improve processing by speeding up search operations when inserting a new event. In some instances, the stream processing engine can dynamically implement insertion buffers upon a determination that the type of disorder of the disordered streaming data can be more efficiently sorted using the insertion buffers. Similar to the examples provided in connection with FIGS. 3 and 4, the streaming engine can maintain an array of a last element of each run to speed up a search operation.

FIG. 7A is a block diagram 700 illustrating an exemplary process flow for speculative processing. In one implementation, the process flow can be performed by the service provider 216 (e.g., the speculative processing module 228) of FIG. 2. However, processes can be performed in other environments and by other devices as well. In some instances, any number of query processing operations can be performed in a process flow, including but not limited to counts, aggregation, sorting, filtering, joining, appending, etc.

In some instances, the incremental sorting described herein can be extended to provide speculative processing to users, which allows users and/or stream processing engines to provide explicit control over the latency-completeness tradeoff, without changing an implementation of operators in the stream processing engine.

In some instances, the framework allows users to specify a latency specification, which in practice, often includes a sequence of logarithmically increasing latency values, such as one second, one minute, and one hour. Given a reorder latency setting, the speculative processing module 228 incrementally provides multiple output streams, corresponding to the specified reorder latencies respectively, for a given query.

FIG. 7A illustrates a partition module 702 that partitions a disordered input stream into multiple disordered output streams, which in turn, are sorted by sorting modules 704, 706, and 708. In some instances, the partition module 702 can partition disordered streaming data based on the amount of time delays. For example, events that arrive less than one second late are buffered by up to one second, and then are incrementally sorted by the sorting module 704 to produce a first partitioned in-order stream 710. The stream 710 output by the sorting module 704 can be consumed by subsequent streaming operators in the execution workflow. Events that arrive between one second and one minute late are sorted every one minute at the sorting module 706, and are streamed through the second path 712. The output of the sorting module 706 can be combined with the ordered events coming from the first path 710 using a union operator 714, which merges and synchronizes two sorted streams (e.g., streams 710 and 712) into one sorted stream 716 (and thus can be considered a blocking operator). As a result, the second output stream 716 contains all events that arrive less than one minute late, in sorted order. Consumers of the second output stream 716 receive these events with a latency of one minute. Similarly, events that arrive between one minute and one hour late are sorted every hour at the sorting module 708, and are streamed through the third path 718. The output of the sorting module 708 can be combined with the ordered events coming from the second path 716 using a union operator 720, which merges and synchronizes two sorted streams (e.g., streams 716 and 718) into one sorted stream 722. As a result, the third output stream 722 contains additional late arriving events and has a latency of one hour. As can be observed in the example, downstream operators in the execution workflow consume early events as quickly as needed, while receiving more late arriving events with a higher latency. In some instances, output streams 710, 716, and/or 722 can be output to additional operators and/or to user via the speculative output module 242.

FIG. 7B is a block diagram 724 illustrating an exemplary process flow for speculative processing including user-defined operators. In some instances, the partition module 726 can corresponds to the partition module 702, and the sorting modules 728, 730, and 732 can correspond to the sorting modules 704, 706, and 708, respectively. In some instances, the block diagram 724 illustrates an improved processing over the process flow as illustrated in FIG. 7A. For example, the block diagram 724 illustrates an advanced framework that embeds user-defined query logic into the execution workflow. Users can provide a pair of query logic functions: the first function, called Partial Input Query (PIQ) function (illustrated as PIQ modules 734, 736, and 738, respectively), partially evaluates query logic on a subset of the input stream, that is, a partitioned in-order stream (output by the sorting modules 728, 730, and 732, respectively), and produces an intermediate result stream; the second function, called merge function (illustrated as merge modules 740 and 742), can combine these intermediate result streams and generates a final result stream. The union operators 744 and 746 can correspond to the union operators 714 and 720, for example.

In one particular implementation of a tumbling window counting query (e.g., having a fixed-sized non-overlapping window), a user can provide a PIQ function (e.g., the modules 734, 736 and 738) that count events in each tumbling window on a partitioned stream, and a merge function (e.g., 740 and 742) that adds the partial results together for every tumbling window.

The embedded query logic in this framework can improve throughput and reduce memory usage. For example, the PIQ modules 734, 736, and 738 can be executed on a set of non-overlapping subsets of the input stream, with each event of the input stream being evaluated by the PIQ modules 734, 736, and 738 exactly once. Thus, redundant computation on the input events can be avoided, thereby improving throughput. Furthermore, by executing the PIQ modules 734, 736, and 738 on partitioned streams in the workflow, union operators (e.g., 744 and 746) turn to buffer intermediate results generated by PIQ operators, instead of original events. In some instances, analytic queries can involve a large volume of input data, but often report aggregate analysis results, which are usually far smaller than the input data. In these scenarios, an intermediate result stream is also usually smaller than the original input stream. Taking the counting query as an example, each PIQ module 734, 736, and 738 produces one event for each tumbling window that represents an aggregate result on a large number of original events. Consequently, the advanced framework illustrated in FIG. 7B can reduces memory usage, thereby improving a functioning of a computer.

Figure 8:
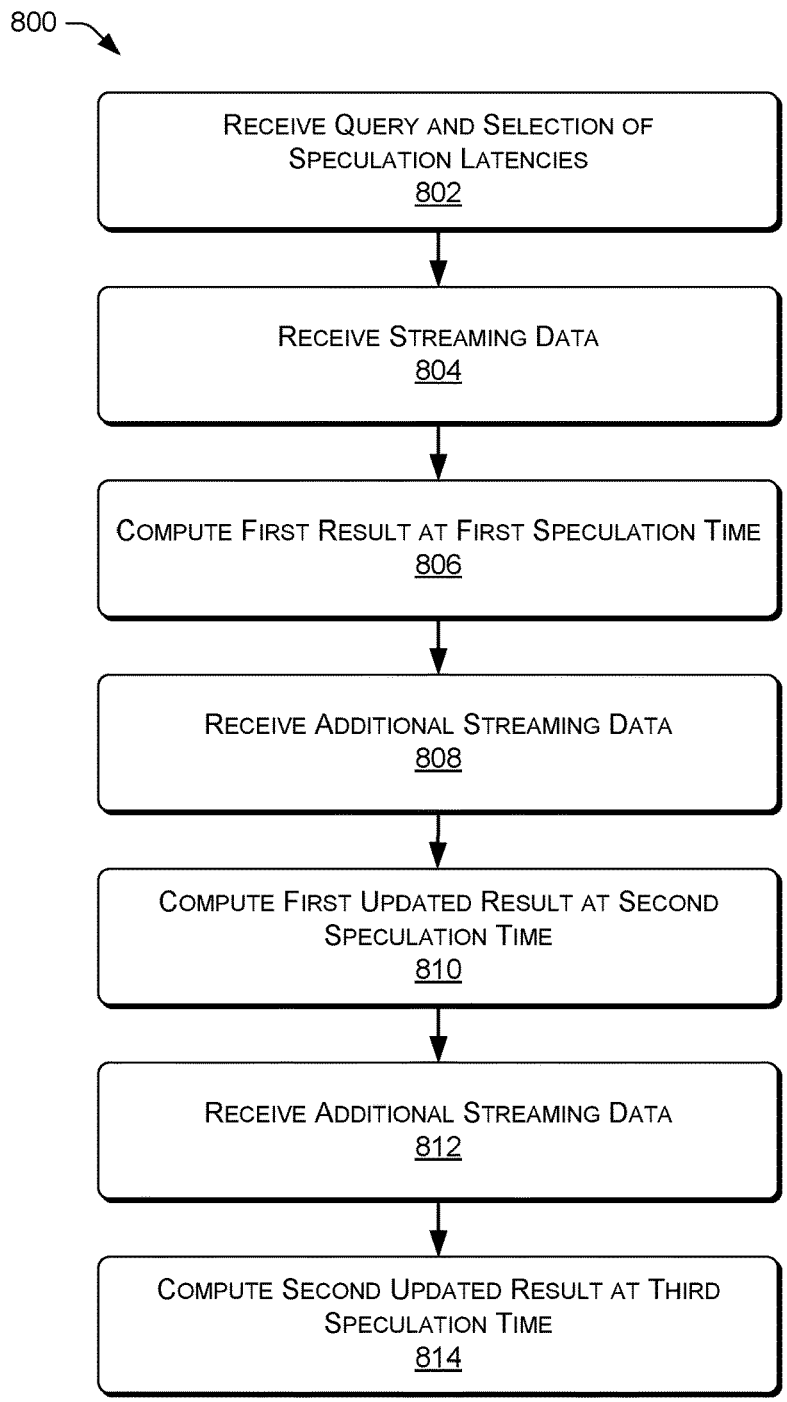
FIG. 8 is a process for speculative processing within a stream processing engine.

FIG. 8 is a process 800 for speculative processing within a stream processing engine. In one implementation, the process 800 can be performed by the service provider 216 (e.g., the speculative processing module 228) of FIG. 2. Exemplary implementations of the speculative processing are provided in connection with FIGS. 7A and 7B, for example. However, processes can be performed in other environments and by other devices as well.

At 802, the operation can include receiving a query and a selection of speculation latencies. For example, a query can be any operation to be performed over streaming data, and can include, but is not limited to, a dashboard including statistics about streaming data (e.g., count, average, standard deviation, etc.). In some instances, the speculation latencies can be time indications after which a user expects a result (e.g., one second, one minute, one hour, etc.).

At 804, the operation can include receiving streaming data. As can be understood, the streaming data can be received as disordered streaming data due to latencies, network delays, network failures, etc. In some instances, disordered streaming data can be presented according to a processing time, which is associated with a time the data event is received at the stream processing engine, and is out-of-order with respect to an event time, which can correspond to a time in which the data event was created.

At 806, the operation can include computing a first result at a first speculation time. For example, this operation can include outputting the first result to a user requesting the speculative processing.

At 808, the operation can include receiving additional streaming data, for example, in the second time interval specified by a second latency value.

At 810, the operation can include computing a first updated result at the second speculation time. In some instances, the operation can include outputting the first updated result to the user requesting the speculative processing.

At 812, the operation can include receiving additional streaming data, and at 814, the operation can include computing a second updated result at the third speculation time.

In some instances, the processing in FIG. 8 can be distinguished from predictive processing, which includes selecting a small sample size (e.g., 1%) of a corpus of data and providing a result with an associated confidence level. In such an example, the corpus of data is known and is available for processing, in contrast to the disordered streaming data of the present stream processing engine.

FIGS. 9-10 illustrate exemplary performances comparing throughput of offline and online sorting on real and synthetic datasets. For example, each dataset includes data events including four 32-bit integer payload fields. The real dataset is represented as CloudLog and AndroidLog datasets. The CloudLog dataset includes events generated at multiple distributed application servers that are then sent to a central server immediately, which aggregates these events to produce a log stream. In the CloudLog dataset, events can usually be delivered to the central server within a second, but might be delayed by up to tens of minutes sometimes when a server failure occurs. The AndroidLog dataset is collected as a part of the Device Analyzer project at the University of Cambridge, and contains real-world usage of over 12,500 Android smartphones worldwide over a period of two years. For example the dataset includes information relating to a user's smartphone activities as events, which are periodically uploaded to a server when the phone is attached to a charger. Due to this uploading strategy, events in this dataset are often delivered to the server hours or even days later. The released dataset has been sorted in event time, while for the performance comparison, the dataset has been reordered in processing time to simulate the raw streaming data received on the server.

Figure 9A:
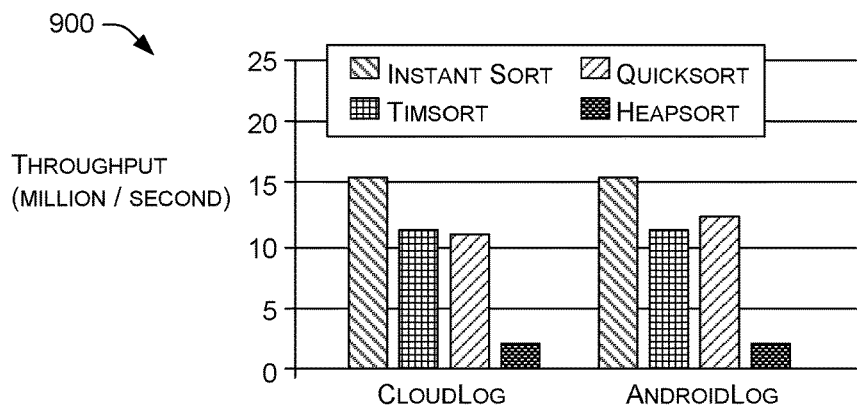
FIGS. 9A-9C illustrate exemplary diagrams comparing throughput of offline sorting on real and synthetic datasets.
Figure 9B:
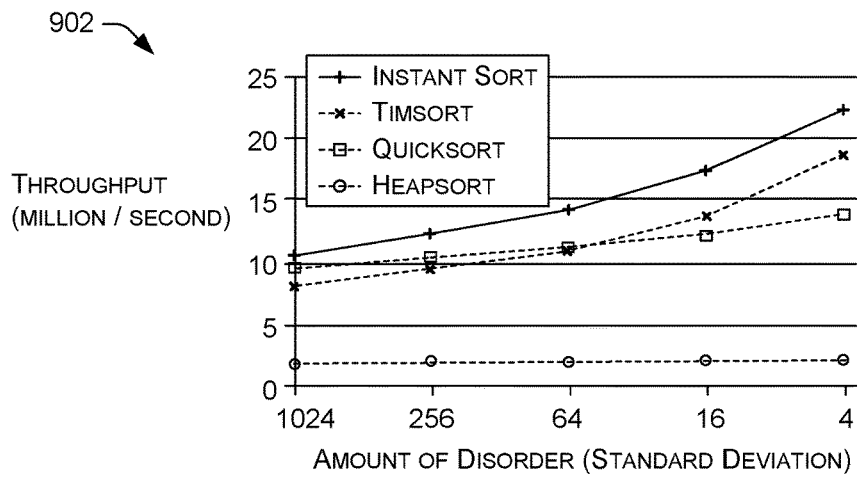
Figure 9C:
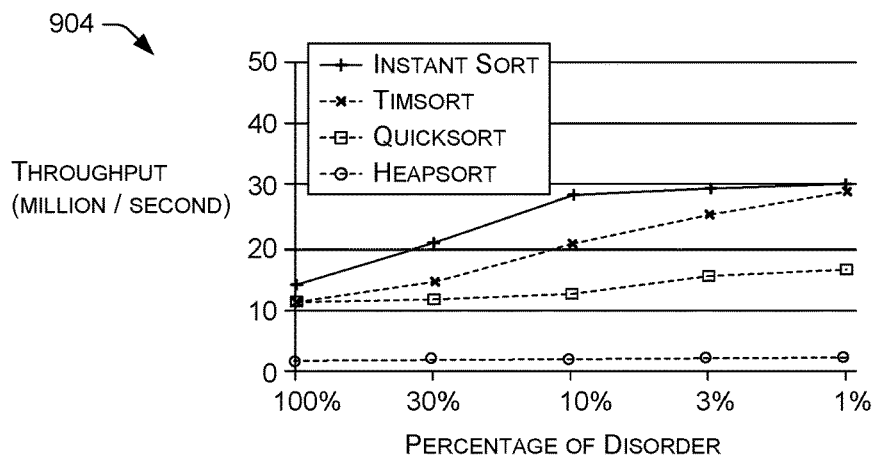

FIGS. 9A-9C illustrate exemplary diagrams 900, 902, and 904 comparing throughput of offline sorting on real and synthetic datasets. As the data sets are offline (e.g., not streaming data), the sorting algorithm can be evaluated without using punctuation events in the input streams. Thus, sorting can be provided after receiving all out-of-order events. In particular, FIG. 9A illustrates the throughput of four sorting algorithms (e.g., the instant incremental sorting algorithm, Quicksort, Timsort, and Heapsort) on the CloudLog and AndroidLog datasets. In some instances, the instant incremental sorting algorithm outperforms other sorting methods, and is 36.2% and 24.6% faster than the other sorting methods on the CloudLog and AndroidLog datasets, respectively. In some instances, this can be a result of the incremental sorting algorithm described herein efficiently leveraging the partial ordering that already exists in these logs.

FIGS. 9B and 9C illustrate the throughput of the four sorting algorithms on the synthetic dataset, with varying the amount of disorder (standard deviation) and the percentage of disorder. The instant incremental sorting algorithm, Quicksort, and Timsort have similar performance when the standard deviation is large or the percentage of disorder is high. However, in a case where an amount of disorder is reduced, the instant incremental sorting algorithm quickly improves its performance, and achieves larger speedup over Quicksort and Timsort.

Figure 10A:
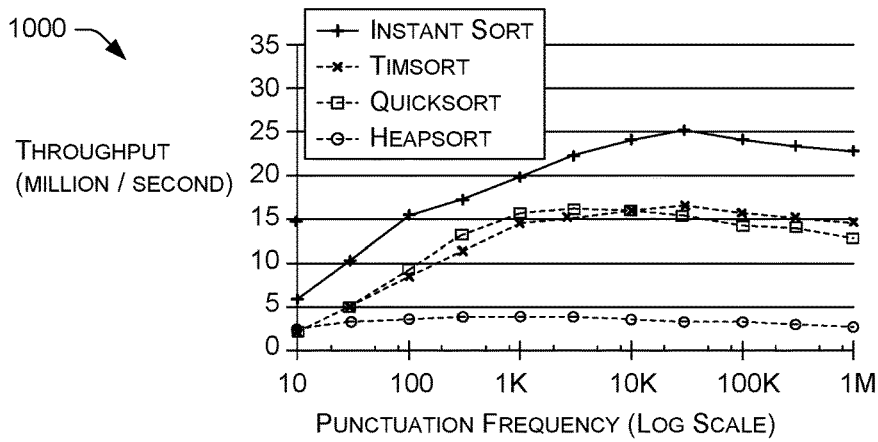
FIGS. 10A-10C illustrate exemplary diagrams comparing throughput of online sorting on real and synthetic datasets.
Figure 10B:
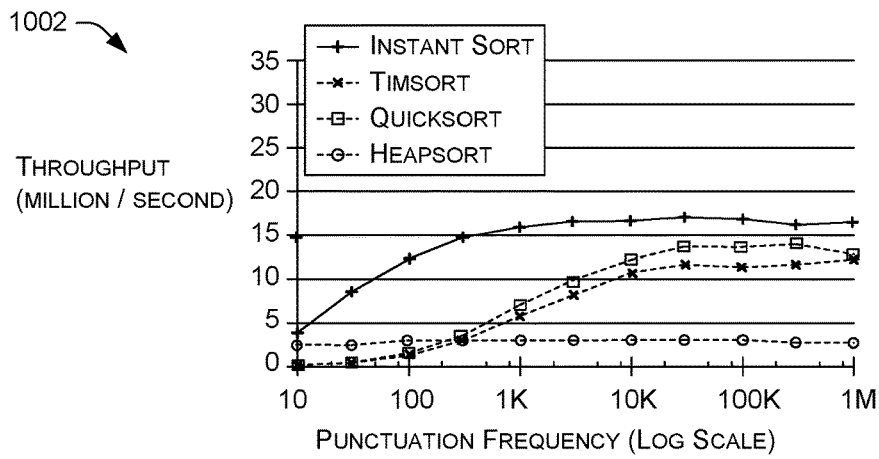
Figure 10C:
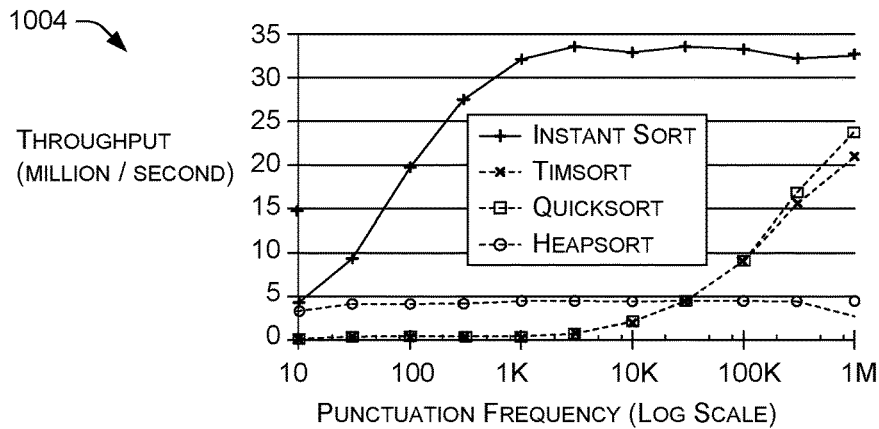

FIGS. 10A-10C illustrate exemplary diagrams comparing throughput of online sorting on real and synthetic datasets. In some instances, the sorting algorithms can be evaluated on streaming data which includes punctuation events for incremental processing. For example, punctuations have been into datasets based on the specified punctuation frequency. When a sorting operator receives a punctuation, the sorting operator can immediately sort and emit all events that are prior to the timestamp specified in the punctuation.

FIG. 10A illustrates the throughput of the four sorting algorithms on 1) the synthetic dataset having a disorder percentage of 30%, 2) the CloudLog dataset, and 3) the AndroidLog dataset, with varying the punctuation frequency between 10 and 1,000,000. In some instances, the value of punctuation frequency represents the number of events between two continuous punctuations. In one example, the synthetic workload contains no severely late events, which means that the sorting operator can process all input data by waiting for a short period of time. For this synthetic dataset, the inserted punctuations were configured to make the sorting operator track approximately 1000 events. On the other hand, the CloudLog and AndroidLog datasets contain a small and a very large number of severely late events, respectively. Thus, the input stream for the CloudLog and Android datasets were configured to make the sorting operator buffer around 10,000 and 10,000,000 events and thus process 99% and 60% of the input data on the CloudLog and AndroidLog datasets, respectively.

As illustrated in FIG. 10A, the instant incremental sorting algorithm can be 1.3×-2.1× faster than the other sorting methods across all punctuation frequency, in the context of the synthetic dataset.

However, in some instances, the instant incremental sorting algorithm yields far higher speedup factors on real datasets, where the sorting operator has to buffer a large number of events to tolerate severely late events. FIGS. 10B and 10C illustrate that the instant incremental sorting algorithm achieves 1.3×-4.4× and 1.3×-7.9× performance improvement over some sorting implementations on the CloudLog and AndroidLog datasets, respectively. For example, the instant incremental sorting algorithm internally maintains a set of sorted runs, and it can quickly find all required events without accessing all the buffered data. Consequently, the sorting performance of the instant incremental sorting algorithm can be related to the punctuation frequency, largely regardless of the number of buffered events.

Example Clauses

Example A, a system comprising: one or more processors; and memory storing modules that, when executed by the one or more processors, cause the system to perform operations comprising: receiving disordered streaming data, the disordered streaming data represented in order according to a processing time and out-of-order according to an event time, the processing time associated with a first time in which a data element is received by the system, and the event time associated with a second time in which the data element is generated; partitioning the disordered streaming data into a plurality of ordered runs, the plurality of ordered runs including at least a portion of the disordered streaming data ordered according to individual event times associated with the portion of the disordered streaming data; asserting a punctuation control event, the punctuation control event associated with a timestamp; determining, based at least in part on the timestamp associated with the punctuation control event, at least a first partial run associated with a first run of the plurality of ordered runs and a second partial run associated with a second run of the plurality of ordered runs; outputting the at least the first partial run and the second partial run based on the punctuation control event;

merging the at least the first partial run and the second partial run as sorted streaming data, the sorted streaming data ordered according to event times associated with the sorted streaming data; determining that at least one run of the plurality of ordered runs is empty following the outputting of the at least the first partial run and the second partial run; removing the at least one run, the removing including releasing memory allocated to the at least one run; and outputting the sorted streaming data.

Example B, the system of Example A, wherein the operations further comprise: receiving a plurality of speculation latencies associated with a plurality of times to output one or more speculative outputs; receiving a query associated with the disordered streaming data; performing, at a first time associated with the plurality of speculation latencies, at least one query processing operation on the sorted streaming data; outputting a first speculative output at the first time, the first speculative output representing a first output of the at least one query processing operation; performing, at a second time associated with the plurality of speculation latencies, the at least one query processing operation on additional streaming data, the additional streaming data associated with a time between the first time and the second time; and outputting a second speculative output at the second time, the second speculative output representing a second output of the at least one query processing operation.

Example C, the system of Example A or Example B, wherein the partitioning further comprises: appending a first data element at an end of the first run; comparing an event time of a second data element with an event time of the first data element to determine that the second data element comes later in time than the first data element; and appending the second data element at the end of the first run.

Example D, the system of Example C, wherein the partitioning further comprises: comparing an event time of a third data element with the event time of the second data element to determine that the third data element comes earlier in time than the second data element; and appending the third data element at an end of a second run.

Example E, the system of any one of Example A through Example D, wherein the operations further comprise: maintaining an array that includes a last element of each run of the plurality of the ordered runs; receiving a data element to insert into a run of the plurality of ordered runs; performing a binary search on the array to compare an event time of the data element with an event time of at least one last element of the array; and based at least in part on the binary search, appending the data element to an end of a run of the plurality of ordered runs.

While Example A through Example E are described above with respect to a system, it is understood in the context of this document that the content of Example A through Example E may also be implemented via a device, computer storage media, and/or a method.

Example F, a computer-implemented method comprising: receiving disordered streaming data; partitioning a first portion of the disordered streaming data into a first ordered run; partitioning a second portion of the disordered streaming data into a second ordered run; asserting a punctuation control event; outputting, based at least in part on the punctuation control event, a first partial run of the first ordered run; outputting, based at least in part on the punctuation control event, a second partial run of the second ordered run; merging, as sorted streaming data, the first partial run and the second partial run; and outputting the sorted streaming data.

Example G, the computer-implemented method of Example F, further comprising: storing a first indication of a last element of the first ordered run in a last element array; storing a second indication of a last element of the second ordered run in the last element array; and accessing the last element array to determine a location to append a current element of the disordered streaming data.

Example H, the computer-implemented method of Example F or Example G, further comprising: storing a first indication of a last element of the first ordered run in a last element array; storing a second indication of a last element of the second ordered run in the last element array; searching the last element array to determine that a timestamp of a current element of the disordered streaming data is earlier than a timestamp of the last element of the first ordered run and earlier than a timestamp of the last element of the second ordered run; and partitioning the current element into a third ordered run.

Example I, the computer-implemented method of Example H, further comprising storing a third indication of a last element of the third ordered run in the last element array.

Example J, the computer-implemented method of any one of Example F through Example I, further comprising associating a weight with the first partial run based at least in part on a length of the first partial run.

Example K, the computer-implemented method of Example J, further comprising associating the first partial run with a binary merge tree based at least in part on the weight associated with the first partial run.

Example L, the computer-implemented method of any one of Example F through Example K, further comprising:

determining that the second ordered run is empty; and removing the second ordered run from a memory.

Example M, the computer-implemented method of any one of Example F through Example L, further comprising, in response to the punctuation control event, performing a binary search on the first ordered run to determine at least one element having a timestamp earlier than a timestamp associated with the punctuation control event.

Example N the computer-implemented method of any one of Example F through Example M, further comprising associating an insertion sort buffer with the first ordered run, and wherein partitioning the first portion of the disordered streaming data into the first ordered run includes at least sorting the first portion of the disordered streaming data in the insertion sort buffer.

Example O, the computer-implemented method of any one of Example F through Example N, further comprising outputting at least one element associated with the insertion sort buffer to the first ordered run upon determining that the insertion sort buffer is full and a current element is to be inserted into the insertion sort buffer.

While Example F through Example O are described above with respect to a method, it is understood in the context of this document that the content of Example F through Example O may also be implemented via a device, system, and/or computer storage media.

Example P, a system comprising: one or more processors; and memory storing modules that, when executed by the one or more processors, cause the system to perform operations comprising: receiving disordered streaming data; partitioning a first portion of the disordered streaming data into a first ordered run; partitioning a second portion of the disordered streaming data into a second ordered run; asserting a punctuation control event; outputting, based at least in part on the punctuation control event, a first partial run of the first ordered run; outputting, based at least in part on the punctuation control event, a second partial run of the second ordered run; merging, as sorted streaming data, the first partial run and the second partial run; and outputting the sorted streaming data.

Example Q, the system of Example P, the operations further comprising: storing a first indication of a last element of the first ordered run in a last element array; storing a second indication of a last element of the second ordered run in the last element array; searching the last element array to determine that a timestamp of a current element of the disordered streaming data is earlier than a timestamp of the last element of the first ordered run and earlier than a timestamp of the last element of the second ordered run; and partitioning the current element into a third ordered run.

Example R, the system of Example Q, the operations further comprising associating a weight with the first partial run based at least in part on a length of the first partial run.

Example S, the system of Example R, the operations further comprising associating the first partial run with a binary merge tree based at least in part on the weight associated with the first partial run.

Example T, the system of any one of Example P through Example S, the operations further comprising associating an insertion sort buffer with the first ordered run, and wherein partitioning the first portion of the disordered streaming data into the first ordered run includes at least sorting the first portion of the disordered streaming data in the insertion sort buffer.

While Example P through Example T are described above with respect to a system, it is understood in the context of this document that the content of Example P through Example T may also be implemented via a device, computer storage media, and/or a method.

Conclusion

Although the present disclosure can use language that is specific to structural features and/or methodological operations, the disclosure is not limited to the specific features or operations described herein. Rather, the specific features and operations are disclosed as illustrative forms of implementing the disclosure.

What is claimed is:

1. A system comprising:
one or more processors; and
memory storing modules that, when executed by the one or more processors, cause the system to perform operations comprising:
receiving disordered streaming data, the disordered streaming data represented in order according to a processing time and out-of-order according to an event time, the processing time associated with a first time in which a data element is received by the system, and the event time associated with a second time in which the data element is generated;
partitioning the disordered streaming data into a plurality of ordered runs, the plurality of ordered runs including at least a portion of the disordered streaming data ordered according to individual event times associated with the portion of the disordered streaming data;
asserting a punctuation control event, the punctuation control event (1) associated with a timestamp and (2) indicating progress of a device generating at least a portion of the disordered streaming data up to a time indicated by the timestamp;
determining, based at least in part on the timestamp associated with the punctuation control event, at least a first partial run associated with a first run of the plurality of ordered runs and a second partial run associated with a second run of the plurality of ordered runs;
outputting the at least the first partial run and the second partial run based on the punctuation control event;
merging the at least the first partial run and the second partial run as sorted streaming data, the sorted streaming data ordered according to event times associated with the first partial run and the second partial run;
determining that at least one run of the plurality of ordered runs is empty following the outputting of the at least the first partial run and the second partial run;
removing the at least one run, the removing including releasing memory allocated to the at least one run; and
outputting the sorted streaming data.

2. The system of claim 1, wherein the operations further comprise:
receiving a plurality of speculation latencies associated with a plurality of times to output one or more speculative outputs;
receiving a query associated with the disordered streaming data;
performing, at a first time associated with the plurality of speculation latencies, at least one query processing operation on the sorted streaming data;
outputting a first speculative output at the first time, the first speculative output representing a first output of the at least one query processing operation;
performing, at a second time associated with the plurality of speculation latencies, the at least one query processing operation on additional streaming data, the additional streaming data associated with a time between the first time and the second time; and outputting a second speculative output at the second time, the second speculative output representing a second output of the at least one query processing operation.

3. The system of claim 1, wherein the partitioning further comprises:
appending a first data element at an end of the first run;
comparing an event time of a second data element with an event time of the first data element to determine that the second data element comes later in time than the first data element; and
appending the second data element at the end of the first run.

4. The system of claim 3, wherein the partitioning further comprises:
comparing an event time of a third data element with the event time of the second data element to determine that the third data element comes earlier in time than the second data element; and
appending the third data element at an end of a second run.

5. The system of claim 1, wherein the operations further comprise:
maintaining an array that includes a last element of each run of the plurality of the ordered runs;
receiving a data element to insert into a run of the plurality of ordered runs;
performing a binary search on the array to compare an event time of the data element with an event time of at least one last element of the array; and
based at least in part on the binary search, appending the data element to an end of a run of the plurality of ordered runs.

6. A computer-implemented method comprising:
receiving disordered streaming data, the disordered streaming data represented in order according to a processing time and out-of-order according to an event time, the processing time associated with a first time in which a data element is received by the computer, and the event time associated with a second time in which the data element is generated;
partitioning a first portion of the disordered streaming data into a first ordered run ordered according to individual event times associated with the first portion of the disordered streaming data;
partitioning a second portion of the disordered streaming data into a second ordered run ordered according to individual event times associated with the second portion of the disordered streaming data;
receiving a punctuation control event, the punctuation control event (1) associated with a timestamp and (2) indicating progress of a device generating at least a portion of the disordered streaming data up to a time indicated by the timestamp;
outputting, based at least in part on the punctuation control event, a first partial run of the first ordered run;
outputting, based at least in part on the punctuation control event, a second partial run of the second ordered run;
merging, as sorted streaming data, the first partial run and the second partial run, the sorted streaming data ordered according to event times associated with the first partial run and the second partial run; and
outputting the sorted streaming data.

7. The computer-implemented method of claim 6, further comprising:

storing a first indication of a last element of the first ordered run in a last element array;
storing a second indication of a last element of the second ordered run in the last element array; and
accessing the last element array to determine a location to append a current element of the disordered streaming data.

8. The computer-implemented method of claim 6, further comprising:
storing a first indication of a last element of the first ordered run in a last element array;
storing a second indication of a last element of the second ordered run in the last element array;
searching the last element array to determine that a timestamp of a current element of the disordered streaming data is earlier than a timestamp of the last element of the first ordered run and earlier than a timestamp of the last element of the second ordered run; and
partitioning the current element into a third ordered run.

9. The computer-implemented method of claim 8, further comprising storing a third indication of a last element of the third ordered run in the last element array.

10. The computer-implemented method of claim 6, further comprising associating a weight with the first partial run based at least in part on a length of the first partial run.

11. The computer-implemented method of claim 10, further comprising associating the first partial run with a binary merge tree based at least in part on the weight associated with the first partial run.

12. The computer-implemented method of claim 6, wherein the first ordered run and the second ordered run are stored in a memory, the method further comprising:
determining that the second ordered run is empty; and
removing the second ordered run from the memory.

13. The computer-implemented method of claim 6, further comprising, in response to the punctuation control event, performing a binary search on the first ordered run to determine at least one element having a timestamp earlier than a timestamp associated with the punctuation control event.

14. The computer-implemented method of claim 6, further comprising associating an insertion sort buffer with the first ordered run, and wherein partitioning the first portion of the disordered streaming data into the first ordered run includes at least sorting the first portion of the disordered streaming data in the insertion sort buffer.

15. The computer-implemented method of claim 6, further comprising outputting at least one element associated with an insertion sort buffer to the first ordered run upon determining that the insertion sort buffer is full and a current element is to be inserted into the insertion sort buffer.

16. A system comprising:
one or more processors; and
memory storing modules that, when executed by the one or more processors, cause the system to perform operations comprising:
receiving disordered streaming data, the disordered streaming data represented in order according to a processing time and out-of-order according to an event time, the processing time associated with a first time in which a data element is received by the computer, and the event time associated with a second time in which the data element is generated;
partitioning a first portion of the disordered streaming data into a first ordered run ordered according to individual event times associated with the first portion of the disordered streaming data;

partitioning a second portion of the disordered streaming data into a second ordered run ordered according to individual event times associated with the second portion of the disordered streaming data;

receiving a punctuation control event, the punctuation control event (1) associated with a timestamp and (2) indicating progress of a device generating at least a portion of the disordered streaming data up to a time indicated by the timestamp;

outputting, based at least in part on the punctuation control event, a first partial run of the first ordered run;

outputting, based at least in part on the punctuation control event, a second partial run of the second ordered run;

merging, as sorted streaming data, the first partial run and the second partial run, the sorted streaming data ordered according to event times associated with the first partial run and the second partial run; and outputting the sorted streaming data.

17. The system as recited in claim 16, the operations further comprising:

storing a first indication of a last element of the first ordered run in a last element array;

storing a second indication of a last element of the second ordered run in the last element array;

searching the last element array to determine that a timestamp of a current element of the disordered streaming data is earlier than a timestamp of the last element of the first ordered run and earlier than a timestamp of the last element of the second ordered run; and partitioning the current element into a third ordered run.

18. The system as recited in claim 17, the operations further comprising associating a weight with the first partial run based at least in part on a length of the first partial run.

19. The system as recited in claim 18, the operations further comprising associating the first partial run with a binary merge tree based at least in part on the weight associated with the first partial run.

20. The system as recited in claim 16, the operations further comprising associating an insertion sort buffer with the first ordered run, and wherein partitioning the first portion of the disordered streaming data into the first ordered run includes at least sorting the first portion of the disordered streaming data in the insertion sort buffer.

\* \* \* \* \*